May 7, 1968 — F. J. SMITH, JR., ET AL — 3,381,893
IRRIGATION APPARATUSES AND PROCESSES
Filed July 18, 1966 — 7 Sheets-Sheet 1
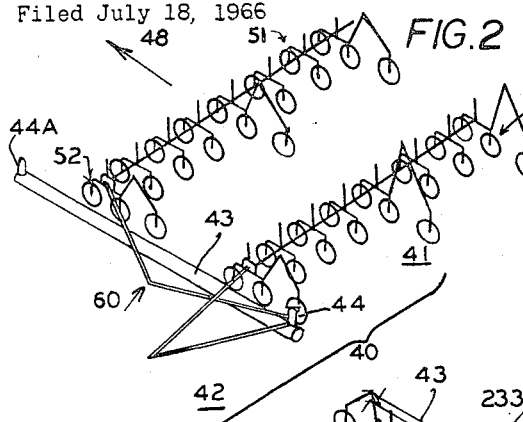
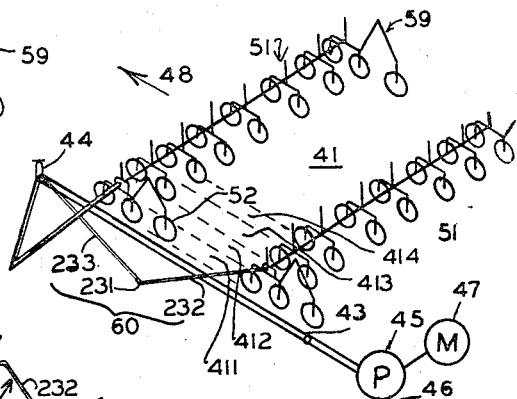
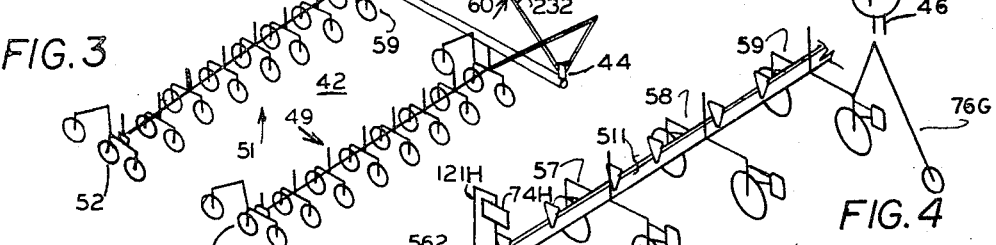
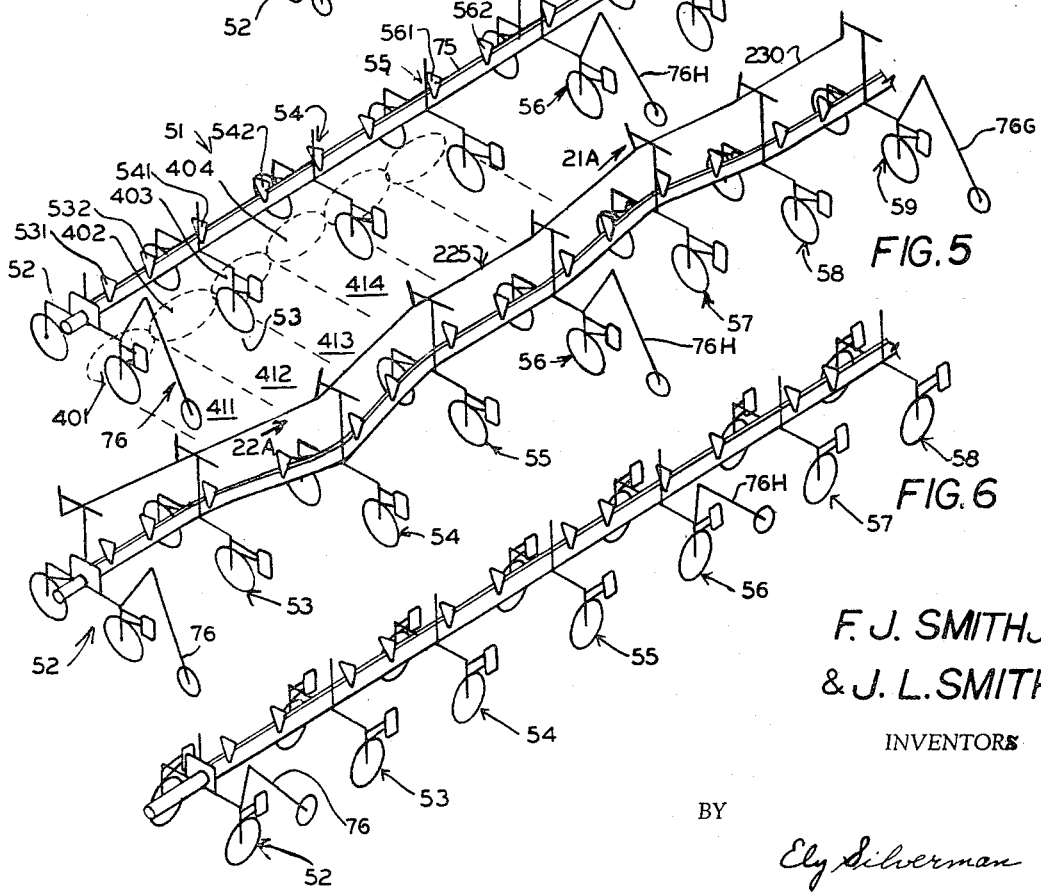
F. J. SMITH Jr.
& J. L. SMITH
INVENTORS
BY
Ely Silverman
ATTORNEY

F. J. SMITH JR.
& J. L. SMITH
INVENTORS

BY

Ely Silverman
ATTORNEY

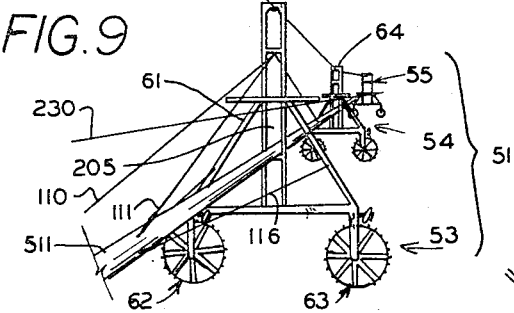
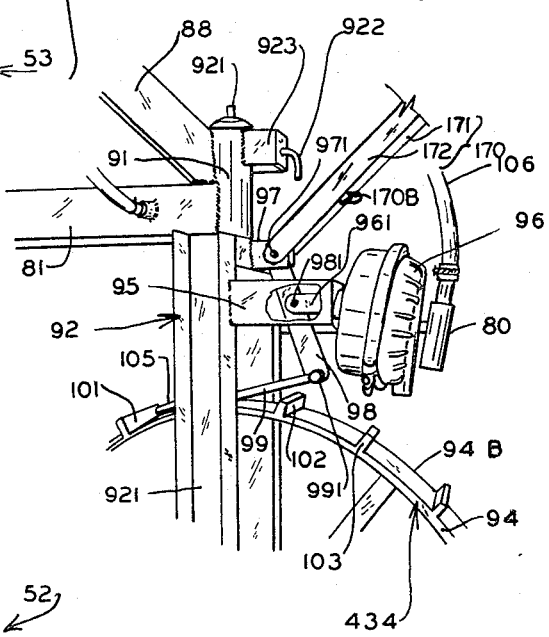
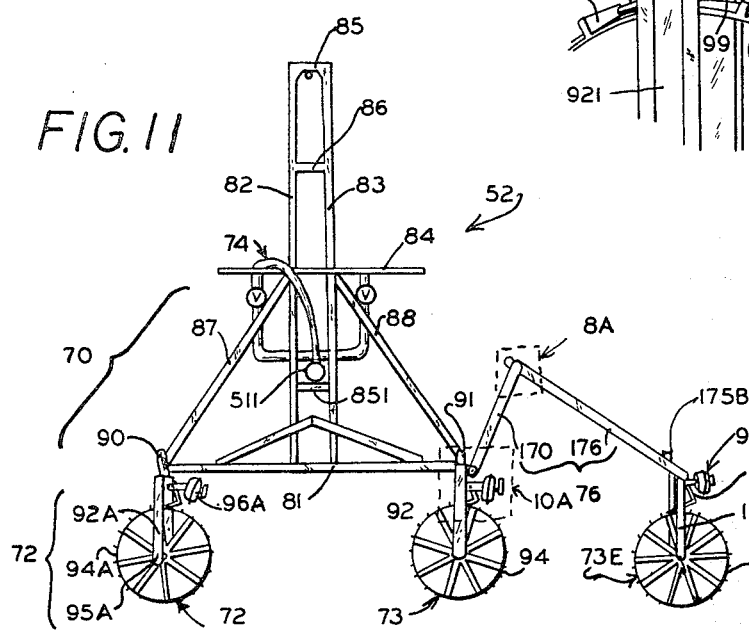

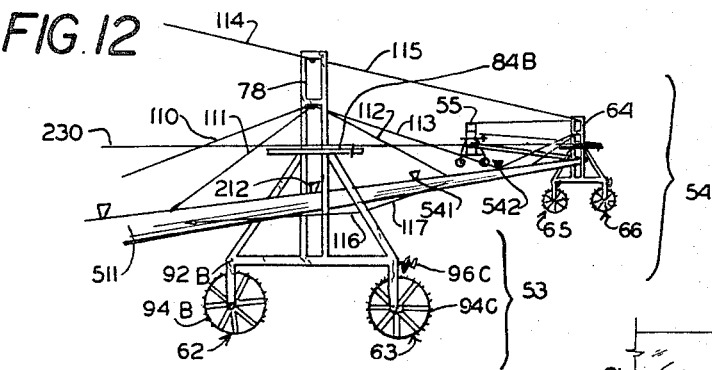
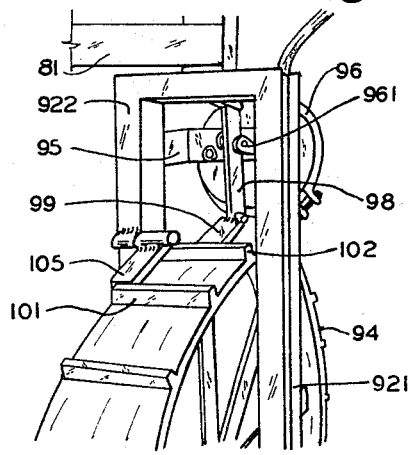
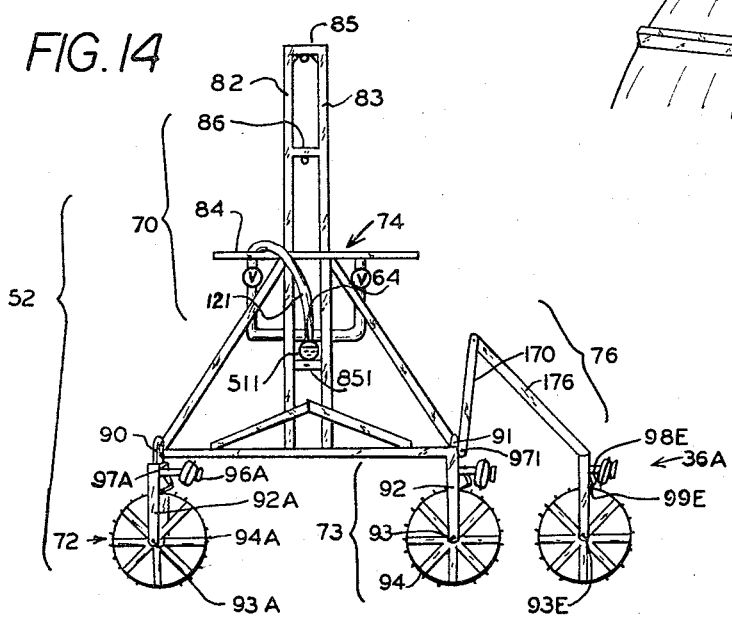

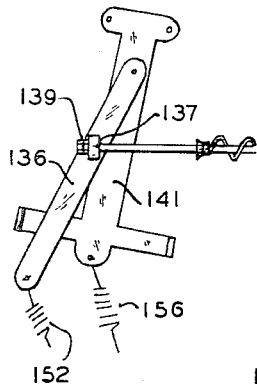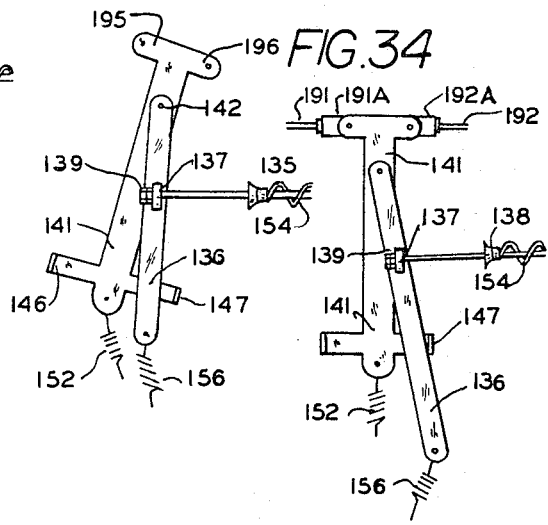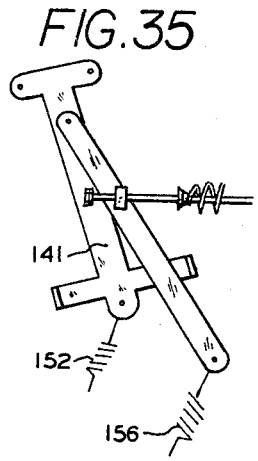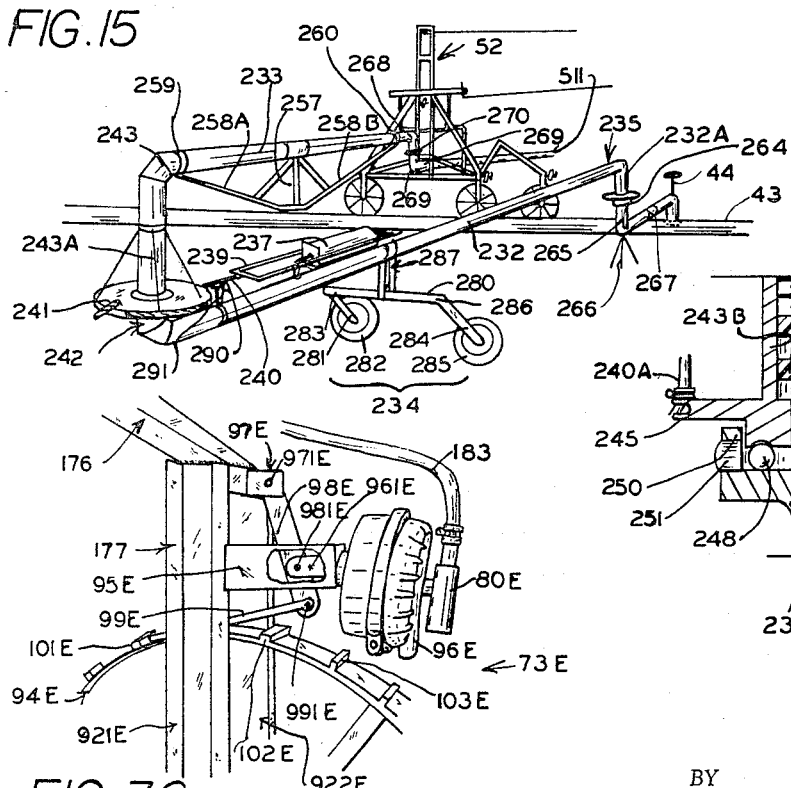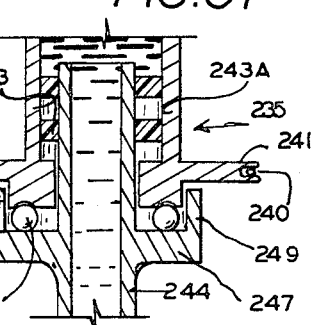
F.J. SMITH Jr
& J.L. SMITH
INVENTORS
BY
Ely Silverman
ATTORNEY

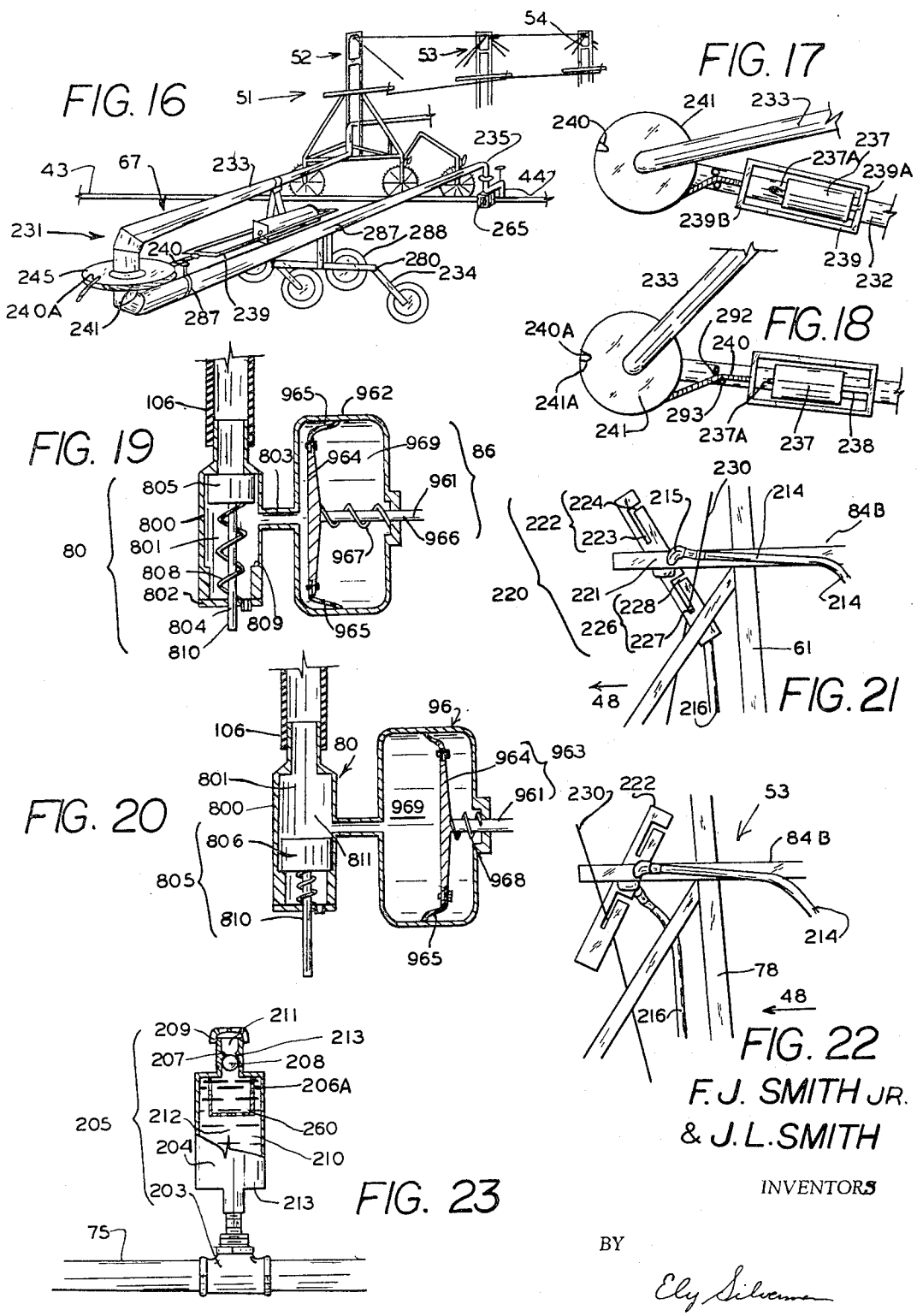

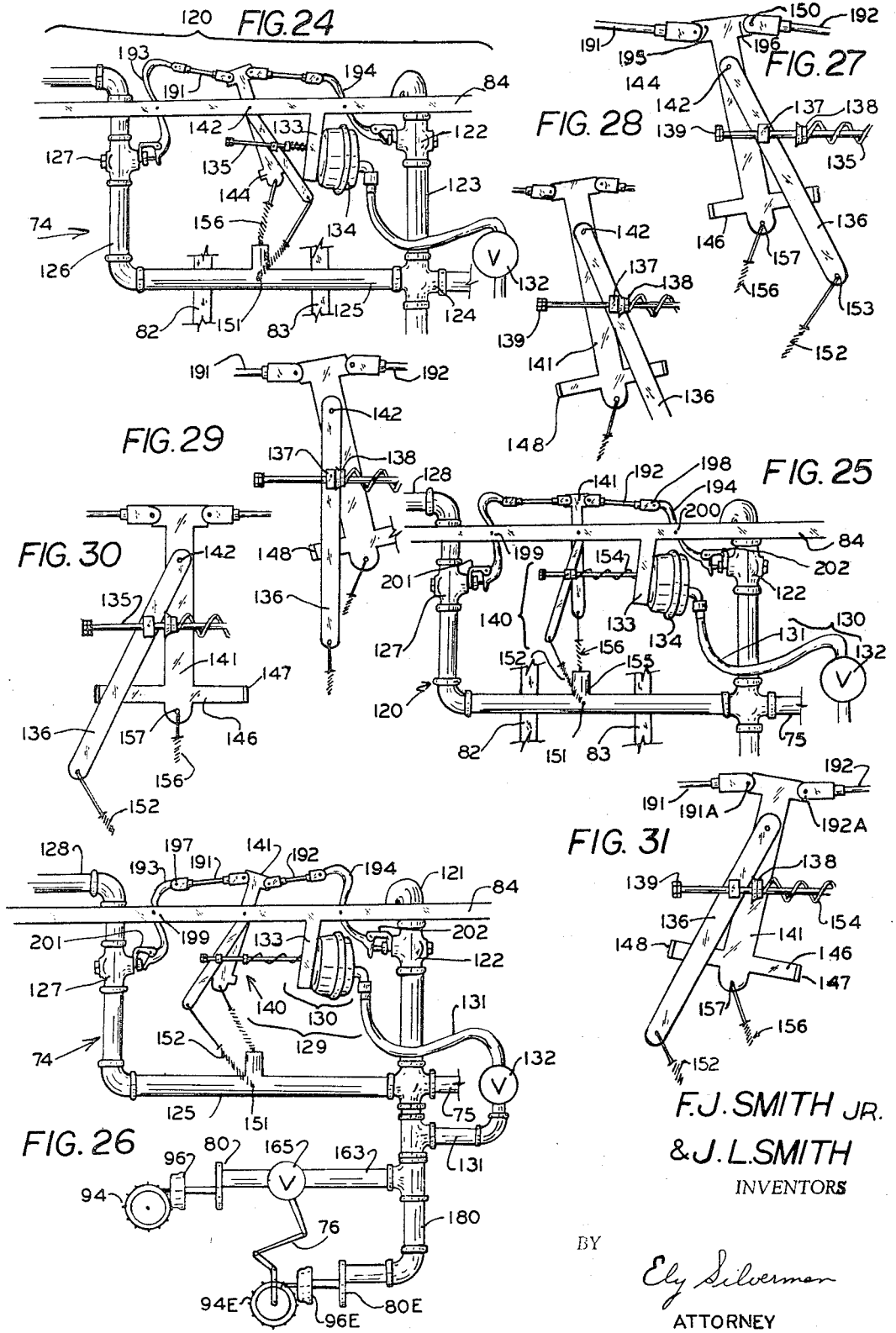

United States Patent Office 3,381,893
Patented May 7, 1968

3,381,893
IRRIGATION APPARATUSES AND PROCESSES
Frank J. Smith, Jr., and Jarrell Lee Smith, both of
San Jon, N. Mex. 88434
Filed July 18, 1966, Ser. No. 565,931
9 Claims. (Cl. 239—1)

This invention relates to improved apparatuses for sprinkler irrigation and to an improved process of sprinkler irrigation operations provided thereby.

The invention below disclosed provides for continuously moving apparatuses that utilize the energy of the water in the sprinkler pipe system to provide the motive force for steadily moving and aligning sprinkler supports as well as steadily and evenly distributing the irrigation water on the field to be treated.

According to this invention, the 40 to 100 p.s.i.g. pressure usually used in sprinkler lines to effect an even atomization of the water to be used for the treatment of the land and crops below the sprinkler line is so connected to and utilized as to provide a powerful and steady reliable power source for automatically moving and aligning each of a series of irrigation pipe supporting apparatuses.

More particularly this invention provides a series of several movable pipe supporting stations each provided with apparatus for controllably converting hydraulic pressure to movement of that station, an orientation system for aligning those stations during motion and sprinkling and a timing mechanism for controlling the speed of motion of those stations. In the exemplary embodiment below described, each pipe supporting station has two hydraulically actuated wheel driving cylinders; each such cylinder has a cross section of about 30–50 square inches operatively yet directly connected in parallel through speed and alignment control mechanisms to the main irrigation pump for the section of land being treated by such irrigation apparatus.

The sprinkler according to this invention provides that the power applied to the parallel connected drive wheels of any one pipe supporting station is directly connected to the power source therefor and is not dependent upon transmission of power delivered serially thereto through each of its neighboring station and so avoids the situation resultant when a drive shaft twists preparatory to delivering torque from one neighboring station to another as such pipes may untwist on slippage of such intermediate stations. Also, because of the continuous motion of the sprinkler of this invention, trail lines are not required, while, in contrast thereto, apparatuses that draw sprinklers therebehind on trail lines are subject to the time and mechanical and expense disadvantage that such lines are usually required to be emptied prior to their movement and rearranged on change of direction of motion of the apparatus. Further, the sprinkler of this invention is not only adapted for continuous aligned movement but it is so without high bearing stress on land or on power transmission elements. Additionally, the apparatus and process of this invention does not require lubricants that are exposed and lost to the field for power transmission from the power source to the pipe supporting stations. The apparatus of this invention may also be automatically stopped and started on stopping and starting of the flow of irrigation fluid thereto.

One object of this invention is to provide a method for continuous operation of irrigation apparatus.

Another object of this invention is to provide an improved sprinkler apparatus for movement over land and/or crops to be irrigated.

Yet another object of this invention is to provide an irrigation apparatus speed control method and apparatus.

Still yet another object of this invention is to provide a method of control of advance and alignment of moving irrigation apparatus over the fields and crops which are to be treated thereby.

Still a further object is an improved escapement mechanism which provides for the drive of hydraulically powered irrigation apparatus over fields to be treated.

Other objects of this invention will become apparent to those skilled in the art on the study of the hereto attached and below discussed drawings, which description of the drawings forms a part of this specification and in which drawings the same reference numeral refers to the same part throughout. Some of these drawings are shown to scale to facilitate understanding of the description thereof, while others are shown diagrammatically to accentuate the principle of operation thereof or to illustrate critical although physically small features thereof.

In the drawings FIGURES 1, 2, and 3 are diagrammatic isometric views of the overall structure of the apparatus of the invention in sequential positions of the water line connector assembly and the sprinkler assembly during operation of the apparatus; FIGURE 1 shows two successive positions of the apparatus 50 relative to the pipeline 43 during motion thereof across a field 40 upward and to the left; FIGURE 2 shows two successive positions of the water line connector and the sprinkler assembly and the pipeline during travel to positions further upward and leftward than shown in FIGURE 1; FIGURE 3 shows two sequential positions of the water line connector assembly and the sprinkler assembly during motion thereof in a direction downward and to the right on the opposite side of the water line 43 than shown in FIGURES 1 and 2 during operation of apparatus 50.

FIGURES 4, 5, and 6 are isometric diagrammatic views of representative portions of the overall sprinkler assembly 51 to a larger scale than in FIGURES 1–3 and showing portions of the major parts thereof during different operative positions thereof.

FIGURES 4 and 5 show the wheel subassemblies of the stations oriented in planes perpendicular to the length of the pipe 511 of the sprinkler assembly 51 for motion transverse to the direction of length of the pipe 511. FIGURE 4 shows major subassemblies of the sprinkler assembly 51 while that assembly is moving upward and to the left as in FIGURE 1, with all stations thereof in a straight line.

FIGURE 5 shows the apparatus portions shown in FIGURE 4 in the position of the parts thereof operating as in FIGURE 4 but wherein the stations are not in a straight line, one station being in advance of and one station being to the rear of the other stations of that assembly; and FIGURE 6 is an isometric diagrammatic view of the sprinkler assembly with all the wheels of the stations thereof turned to a plane parallel to the length of the pipe 511 for motion of apparatus 51 parallel to pipe 511.

Figure 7:
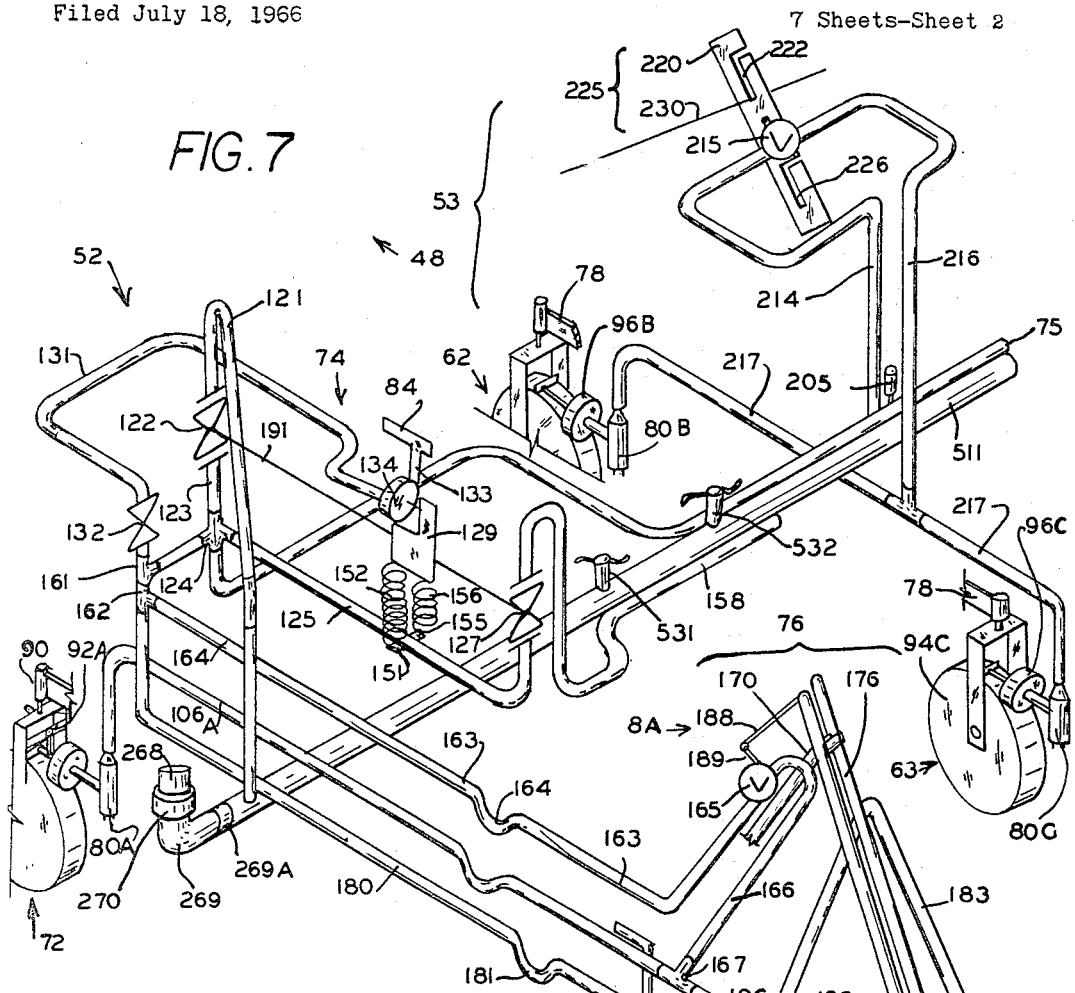
FIGURE 7 is an isometric piping diagram, not to scale, of piston, valve and piping connections in the hydraulic engine timer subassembly and pacemaker assembly at the end station 52 and in the adjacent station 53.

FIGURE 9 is a side perspective view to scale of stations 53 and 54 and adjacent parts of the sprinkler subassembly 51 in the position of parts thereof shown in FIGURE 4.

FIGURE 10 is an enlarged view generally to scale of assembly 73 and assembly 92 in zone 10A of FIGURE 11 (link 98 is shown enlarged).

FIGURE 11 is a scale and perspective side view of the end station 52 in the end station wheel drive retard control position of the control frame subassembly 76.

FIGURE 12 is a side perspective view to scale of the portions of the sprinkler subassembly shown in FIGURE 9 in the position of parts thereof as shown in FIGURE 5 wherein one of the stations, 54, is out of line and in retard with respect to the other stations.

FIGURE 13 is a front view of the apparatus shown in FIGURE 10 with the yoke and wheel drive subassembly turned in the position thereof as shown in FIGURE 6.

FIGURE 14 is a view taken as in FIGURE 11 but with the control frame subassembly 76 shown in its end station wheel drive advance control position.

FIGURE 15 is an isometric overall view of the combination of connector assembly 60 and sprinkler assembly 51 according to the exemplary embodiment of this invention.

FIGURE 16 is a view similar to FIGURE 15 of another embodiment of connector assembly, 67, and sprinkler assembly 51 of the invention.

FIGURE 17 is an enlarged diagrammatic plan view of apparatus adjacent pivot joint 231 of FIGURE 15 in the contracted position of the connector arm piston 237.

FIGURE 18 is a view as in FIGURE 17 of the connector subassembly with the connector arm piston 237 in an expanded position.

FIGURE 19 is a diagrammatic longitudinal enlarged vertical cross-sectional view of the wheel cylinder 96 and its valve 80 shown in FIGURE 10 in the full exhaust position of the parts thereof;

FIGURE 20 is a longitudinal cross-sectional view as in FIGURE 19 of the wheel cylinder 96 and its valve 80 in the full charge and advanced position of the parts thereof;

FIGURE 21 is a diagrammatic perspective view of the station drive control valve, control arm and wire of station 53 when in their station retard position when that station is in the advanced position shown for station 57 in FIGURE 5 and as viewed along the direction of arrow 21A of FIGURE 5;

FIGURE 22 is a diagrammatic perspective view of the station drive control valve control arm of the station drive control arm and wire of station 53 when in their station advance position when the station is in the retarded position shown for station 54 in FIGURES 5 and 12 and as viewed along the direction of arrow 22A in FIGURE 5 and also as seen in FIGURE 12;

FIGURE 23 is a part side view and partly broken away and shown in section of the air relief valve 205;

FIGURES 24, 25, and 26 are overall scale side views of the engine timer subassembly 74. FIGURE 24 shows the subassembly 74 in the position of its parts at the beginning of its cycle with valve 122 open; FIGURE 25 shows the same subassembly at an intermediate portion in its cycle of operation; and FIGURE 26 shows the subassembly 74 at a later phase of one cycle of its operation with valve 122 closed; this figure also shows diagrammatically other connections of the subassembly 74;

FIGURES 27-35 are enlarged views of arms 136 and 141 of the moving arms of the piston snap link assembly 129; FIGURES 27-31 show the relative positions of arms 136 and 141 during the clockwise rotation thereof about pin 142 and motion of piston arm 135 and the lower portions of arms 141 and 136 to the left as shown in FIGURES 24-26;

FIGURES 31-35 show the relative positions of arms 136 and 141 during counterclockwise rotation thereof about pin 142 and motion of piston arm 135 to the right (right as in FIGURES 24-35);

FIGURE 27 shows the arms 136 and 141 of the piston snap link subassembly in the positions thereof shown in FIGURE 24; FIGURE 28 shows the arms 141 and 136 of the piston snap link subassembly in the position thereof subsequent to that shown in FIGURE 27 during the sequence of the motion of the bottom of the arms of the snap link subassembly leftwards in clockwise rotation as shown in FIGURES 24-26; FIGURE 29 is an enlarged view of the arms 141 and 136 of the snap subassembly in the position thereof as shown in FIGURE 25, and subsequent to that shown in FIGURE 28, during the leftward or clockwise (as shown in FIGURES 24-26) motion of the bottoms of the arms 141 and 136 of the piston snap link subassembly; FIGURE 30 is a view of arms 136 and 141 in a further leftward or clockwise rotary motion of those arms of the snap subassembly 121 in a position immediately subsequent to that shown in FIGURE 29;

FIGURE 31 is an enlarged view of the arms 136 and 141 of snap subassembly 129 in the position thereof generally as shown in FIGURE 26 of the snap subassembly; i.e., in the furthest clockwise rotated position thereof wherein the bottom portions thereof are further leftward of the position thereof shown in FIGURES 30 and 25;

FIGURE 32 shows the position of the snap subassembly arms 136 and 141 on beginning of counterclockwise rotation from the positions shown in FIGURES 26 and 32; FIGURE 33 shows the position of arms 136 and 141 on a further clockwise rightward motion from their position shown in FIGURE 33; FIGURE 34 shows a position of arms 136 and 141 further clockwise than in FIGURE 33 and on first engagement of the elements 141 and 136 in a position similar to that shown in FIGURE 29 but in the opposite direction; FIGURE 35 shows the position of arms 136 and 141 immediately subsequent to slight clockwise motion of arm 136 from the position thereof shown in FIGURE 34 and to that position of arms 131 and 146 shown in FIGURES 24 and 27;

FIGURE 36 is an enlarged side view partly broken away of zone 36A of FIGURE 14, generally to scale;

FIGURE 37 is a diagrammatic vertical longitudinal diametral cross-section view of coupling joint 231.

The apparatus 50 according to this invention comprises a sprinkler assembly 51 and a connector assembly 60. The apparatus 51 is adapted to treat a field as 40 which field has a right hand portion 41 and a left hand portion 42 and through which field a straight irrigation pipeline 43 extends. A series of conventional valves, as 44 and 44A, are each operatively attached to the line 43 at regularly spaced intervals of about 100 feet. Each valve, as 44, serves through a disconnect coupling and a pivotal joint 235, to operatively and rotatably connect one end of the subassembly 60 to line 43. The other end of the connector subassembly 60 is operatively and rotatably connected by a movably located pivot joint 270 to the sprinkler assembly 51 and provides, as below described, for operative connection of line 43 to assembly 51 during movement of the apparatus 50 lengthwise of the field 40 in the forward direction (arrow 48) or rearward direction (arrow 49).

The line 43 is operatively connected to a conventional pump 45 which is operatively connected to a power source therefor, as a 200 H.P. engine 47 and to a well 46 which includes a source of water.

The sprinkler assembly 51 comprises a main pipeline 511 and a plurality of similar movable stations 52-59 firmly attached to and supporting said pipe. Each of the intermediate stations, as 53-58, comprises a similar frame and a pair of driving wheel assemblies operatively attached thereto. Each of the end stations as 52 and 59 are also provided with a pacemaker and a timer assembly. In the embodiment 51 the end stations as 52 and 59 are spaced 30 feet from the station adjacent thereto as 53 and 58, respectively: the intermediate stations as 53, 54, 55, 56, and 57 are spaced apart 60 feet: there are 20 like intermediate stations as 53-58 and two end stations in the exemplary embodiment of assembly 51.

End station 52 comprises a frame 70 with (as shown in FIGURES 1, 4, 7, 11, and 14) a front wheel assembly 72 and a rear wheel assembly, as 73. Each of the intermediate stations, as 53, is provided with a frame as 61 similar to frame 70 and is provided with front and rear wheel assemblies, as 62 and 63, structurally and functionally identical to assemblies 72 and 73, respectively. The frame 64 (alike to 61) of assembly 54 (alike to 53) is provided with like front and rear wheel assemblies 65 and 66 like 62 and 63, respectively. The end stations 52 and 59 are identical in structure to each other and the intermediate stations 53 through 58 are identical in structure to each other. The end stations 52 and 59 are located at the lateral ends of the pipe 511 and are identical in structure. The end station 52 is located near one lateral end of the pipe 511 (left in FIGURES 1, 3, 4, 11, and 14) and includes the same structure of frame and wheel assemblies as do the intermediate stations as 53 through 59. Each end station as 52 is also provided with a hydraulic engine timer subassembly, 74, and a pacemaker or control subassembly 76. End station 59 is located at the right end of assembly 51 (right as shown in FIGURE 1). The subassemblies and the components of station 59 are given the same reference numeral as in station 52 followed by the letter G for corresponding subassemblies and components.

The control subassembly 76 is operatively connected to the hydraulic engine timer subassembly 74. The engine timer subassembly 74 is operatively connected to the wheel assemblies 72 and 73 of the station 52. The engine timer subassembly 74 is also operatively and separately connected by the hydraulic drive line 75 to the drive mechanism of each intermediate station, as 53. The line 75 extends along and is mechanically supported by line 511 to each drive subassembly mechanism of each of the remaining stations (as 54, 55, 56, 57, 58, and 59) on the sprinkler assembly 51. The drive mechanisms of each station are thus connected separately to line 75 and, thereby, pump 45.

Each frame as 70 comprises a rigid lower horizontal base angle iron member 81 and, firmly attached thereto near the center thereof, a pair of rigid vertical pipe supporting arms, front arm 82 and rear arm 83. These arms, made of 2-inch steel L's in the exemplary embodiment are each firmly attached to each of three horizontal transverse arms 84, 85, and 86; top transverse arm 85, intermediate transverse arm 86 and a middle transverse guide wire arm 84; arm 84 extends beyond the front and rear of the arms 82 and 83. A rigid front diagonal support member 87 and rear diagonal support member 88 are each made of 2-inch steel L's and are firmly joined at their top to the arms 82 and 83, respectively, and, at their bottoms to a front vertical pivot support arm 90 at the front and to a rear vertical pivot support arm 91 at the rear respectively of the base arm 81.

The drive wheel assemblies 72 and 73 are formed of identical structures and members; the structures and members of assembly 72 are indicated by the same reference numerals as corresponding structures and members on assembly 73 except that the letter "A" follows the reference numeral for the structures and members of assembly 72.

The drive wheel assembly 73 (see FIGURES 10 and 13) comprises a yoke 92, an axle 93, a cleated wheel 94, a piston 96 and a valve 80. The yoke 92 has left and right side arms 922 and 921 (as seen in FIGURE 13); these arms firmly attach to and support the axle 93. The axle rotatably supports the wheel 94 (also, the axle and arms can be regarded as rotatably supported by the wheel). The arms of a rigid U-shaped bracket 95 are firmly attached to the arms 921 and 922 of the yoke 92 and extend horizontally. A hydraulic piston 96 is supported firmly on the outer, base, end of the bracket 95. A rigid piston arm 961 is connected to and extends from the piston towards the space between arms 921 and 922 of the yoke 95. A rigid U-shaped lug 97 is firmly attached to the top of the yoke 92 above bracket 95. A rigid lever arm 98 is pivotally attached by a pin 971 between the arms of lug 97. The forward end of arm 961 is pivotally attached to the arm 98 below pin 971 by a pin 981. A rigid drive link 99 is pivotally connected at its rear end by a pin 991 to the lower end of the arm 98 and rests on the top of the rim of wheel 94 at its front end.

The rim of the drive wheel 94 is, at its entire radial periphery, provided with a series of radially extending equispaced ground engaging cleats as 101, 102, and 103. The link 99 in its operation successively engages and moves each of those cleats one at a time. A rigid locking link 105 is pivotally connected to the yoke arm 922 to provide one-way motion of the wheel 94; in conventional manner it firmly engages the cleats, as 101, one at a time following their propulsion by link 99. Firmly attached thereto, the yoke 92 has at its upper end a vertical cylindrical pivot shaft 921 that is pivotally and firmly located in a cylindrical cavity therefor in the arm 91. A U-shaped bracket 923 is firmly attached to arm 91. A pin 922 is held to arm 91 by bracket 923 and is spring urged toward shaft 921. Shaft 921 has radial holes at its surface that engage pin 922 to hold the arms of yoke 92 in a plane parallel to pipe 511 as in FIGURE 10, or in a plane transverse thereto as in FIGURE 13.

The same drive wheel structures as in subassembly 73 are provided in the drive wheel subassemblies of all the stations of assembly 51; the corresponding elements thereof are denominated by the same reference numeral and the letter "B" for the elements in wheel subassembly 62 and "C" for the corresponding subassemblies in the wheel subassembly 63. Guy wires from each frame assembly of each station as 52, 53, 54, and 55 are firmly attached to the adjacent pipe 511 about a third of the distance between stations from the arms as 85 on station 52 and from the ends of arms as 84 on station 52; for instance, the wires 110 and 111 extend from the frame 54 to the pipe 511 to the left (as shown in FIGURE 12) and corresponding wires 112 and 113 correspondingly extend to the right side of the station 54; additional front and rear guy wires as 116 and 117 are provided to attach and guy each frame station relative to the adjacent portion of the pipe 511. Additionally, guy wires 114 and 115 extend between the tops of adjacent stations as 52 and 53 and 53 and 54 to help align those stations relative to each other.

The piston subassembly 96 comprises (see FIGURES 19 and 20) a cylindrical casing 962 within which is a cylinder chamber 969 and wherein is located a movable piston 963. The piston 963 comprises a rigid flat piston plate 964 and the rigid piston arm 961 attached thereto. A flexible water-tight piston seal 965 attaches the plate 964 to the interior of the casing 962 in a water-tight fashion. The piston arm 961 is a sturdy shaft of uniform transverse cross-section located in a cylindrical bore 966 of the housing 962 which permits axial motion of the piston arm 961 in a direction perpendicular to the length of the plate 964. A compression spring 967 provides for urging the plate 964 away from bore 966.

Each wheel piston valve subassembly as 80 (see FIGURE 19) comprises a vertical hollow cylindrical shell 800, a vertical longitudinal chamber 801 therein, and, in said chamber, a longitudinally reciprocatable piston 805.

The shell 801 has a lower end wall 802 which has an orifice 804 therein for movement of a manual adjustment arm 810 portion of the piston therethrough and a side connection 803 to the piston 96. The piston 805 comprises a piston head 806 and a piston arm 810 and a compression spring 808. The piston head 806 forms a watertight yet slidable fit with the walls of chamber 801. Rod 810 is fixed to the head 806. Spring 808 fits around rod 810. The interior face of the end wall 802 forms a seat on which the bottom of the spring 808 seats.

A shoulder 809, higher than the compressed spring 808, with the distance from shoulder 809 to bottom of the orifice 811 (from chamber 801 to 969) greater than the height of head 806 is located in chamber 801. It supports head 806 on charging of piston 96 by fluid from line 106 as shown in FIGURE 20. On release of pressure in line 106, the top of the spring 808, which spring is a compression spring, based on end wall 802, forces the piston head 806 upward past the point of the orifice 811 between the chamber 801 and the passage 803 therefrom to the piston chamber 969 and in that expanded position of the spring 808 the head 806 seals the line 106 from orifice 811 and the remainder of the chamber 801, as shown in FIGURE 19. Sufficient pressure (40 lbs. p.s.i.g. in embodiment 50) in line 106 overcomes the force of the spring 808 and moves head 806 below orifice 811 and provides, through the orifice 811 and the connection 803, a continuous passage to the chamber 969 within piston 96.

As shown in FIGURES 19 and 20 on application of liquid pressure through the line 106 the movable piston 806 of the valve 80 is forced down and the pressure of the fluid (40–100 lbs. p.s.i.g.) is applied against the plate 964 and that plate and piston 961 moves to the right (right as shown in FIGURES 19 and 20).

At the same time that the piston 964 moves the arm 961 outward of casing 962 from its released position shown in FIGURE 19 to its forward position shown in FIGURE 20, it moves the link arm 99 to the left as shown in FIGURE 10 and provides thereby for motion of the wheel 94 a step in the counterclockwise direction (for the arrangement shown in FIGURE 10). On release of the pressure in the line 106 the plate 964, under the urging of the compression spring 967 (which is seated at one end against the portion of the seat 968 therefor in the casing 962) urges the piston plate 964 leftward as shown in FIGURE 19: at the same time the spring 808 and head 806 in the valve 80 moves upward from the position shown in FIGURE 20 to the position shown in FIGURE 19. This provides for the escape of the water from the chamber 969 of the casing 962 to be discharged outward through the orifice 804 of valve 80.

The hydraulic engine timer subassembly 74 is firmly supported on arms 82, 83, and 84 of the frame 70 of the end station 52. The engine timer subassembly 74 comprises a valve support subassembly 120 and a piston and link and spring subassembly 129 (FIGURE 26) operatively connected. The timer assembly 74 cooperates with but is not a part of the pacemaker control subassembly 76.

Subassembly 74 is directed to providing a repeated periodic hydraulic pulse for all the drive wheels of all the stations of assembly 51. Subassembly 74G of station 59 (similar to 74 of station 52) also provides a periodic pressure pulse for driving all the drive wheels of all of the stations of assembly 51. The utilization of the pulse to move each station by the drive wheel mechanism of that station depends, in the exemplary embodiment, on the position of that station relative to the other stations of assembly 51 and is controlled by the wire 230 and control arms, as 220 on station 53 for that station.

Subassembly 76 is directed to control the linear speed of station 52 (a similar subassembly 59G controls the speed of the other end station 59); the interstation control assembly keeps the intermediate stations as 53–58 of assembly 51 in a straight line between end stations as 52 and 59.

The valve support assembly 120 comprises an input hose line 121 which extends from and operatively connects the line 511 to the top of normally open input valve 122. Valve 122 is operatively connected (through arms 192 and 194) to and controlled by a snap link arm 141 of the piston link subassembly 129. The bottom of valve 122 is firmly and operatively connected to the top of a vertical rigid conduit line 123 (2" I.D. pipe in the exemplary embodiment). The bottom of line 123 is firmly connected to a cross 124. One horizontal arm of the cross is firmly connected to the right (as seen in FIGURE 24) end of a horizontal rigid conduit line 125. Line 125 is a rigid pipe (2" I.D.) and firmly connected to and supported by arms 82 and 83 near to its center: at its left end (as shown in FIGURES 24–26) line 125 is connected to a rigid vertical arm 126 parallel to line 123. The top of line 126 is operatively connected to the bottom of normally closed exhaust valve 127. Valve 127 is operatively connected by its rigid linkage arms 191 and 193 to the top of the snap link 141 of the piston and link subassembly 129. Valve 122 is connected by its rigid link arms to the top of arm 141. By this common connection to the snap link arm 141 the valves 122 and 127 are, at any one time during operation of apparatus 51 one open and the other closed and, at another time the other open and the one closed. The upper end of the valve 127 is operatively connected to a discharge conduit line 128. The line 128 is operatively connected to a discharge pipe 158. The upper ends of valves 122 and 127 are firmly fixed to and supported by arm 84 of frame 70.

The piston link and spring subassembly 129 comprises a piston chamber assembly 130 and a piston snap link and spring assembly 140 (FIGURE 26). Assembly 130 comprises a piston chamber 134 which is in operative hydraulic series connection with a piston chamber line 131, which is in series connection with the piston chamber line control valve 132 which is operatively connected with the cross 124. The piston chamber 134 is firmly mechanically connected and supported by a rigid vertical support arm 133 attached at its top to the bottom of arm 84 about ⅓ distance from valve 122 to valve 127.

The piston chamber 134 is identical in structure to the piston 96 and is provided with a similar piston shaft (135) which is moved out of the chamber of piston 134 by the action of the fluid in the line 131. A supplemental tension spring 154 (supplemental to a spring as 967) moves the piston into the chamber.

The snap link and spring subassembly 140 comprises a piston link 136 and its spring and a snap link assembly 140 operatively connected as below described.

The top end of a rigid piston link 136 is pivotally supported on a pin 142 firmly attached to the middle of member 84. The pistin link 136 is provided with a slide 137 within which the piston 135 of the piston chamber 130 slidably fits.' The piston shaft 135 is provided with a pair of right-hand adjustment lock nuts 138 and a pair of left-hand adjustment lock nuts 139 firmly fixed thereto near to its left (as shown in FIGURES 24–35) and right ends, respectively, to control the motion of arm 136 and, thereby, arm 141 and valves 122 and 127.

The bottom end of link 136 is attached by a compression spring 152 to a bracket 151 on the front (as shown in FIGURES 24–26) arm 125 below the location of pin 142 in arm 84. Spring 152 fits in hole 153 at bottom of arm 136.

The snap link assembly 140 comprises, in operative pivoted connection, a rigid snap link arm 141, upper rigid exhaust valve arms 191 and 193, upper rigid inlet valve arm 192 and 194 and a spring 156.

Arm 141 is vertically elongated and shaped generally like the capital letter I (as in I-beam). Left annd right ears 195 and 196 project laterally from the upper end of arm 141. Ear 195 supports pin 191A; ear 196 supports pin 192A; pin 191A pivotally supports arm 191; pin 192A pivotally supports arm 192. At its lower end arm 141 has a laterally and forwardly projecting U-shaped arm 146; arm 46 is provided at its right end with a forwardly projecting right ear 147 and at its left end with a forwardly projecting left ear 148 (right and left as shown in FIGURES 24–35). These ears extend perpendicular to the length of the piston shaft 135 and are parallel to the length of the pipe 511.

The arm 125 firmly supports at its front (as shown in FIGURES 24–35) a piston spring bracket 151 and at its rear firmly supports a snap link bracket 155. A piston spring 152 is attached to and compressed between the bracket 151 and the lower end of the arm 136 at hole 153. A snap link spring 156 is operatively connected at its top to the bottom of the snap link arm 141 in a hole 157 therefor and its lower end is firmly attached to the bracket 155. These springs are compressed in their vertical position more than when in a diagonal position.

A rigid valve arm 191 is pivotally connected by a pin 197 to rigid valve arm 193 which is pivoted about a pin 199 which pin is firmly supported in the arm 84 near valve 127; arm 193 is pivotally connected to a valve lever support arm 201 which operates on a piston to move the normally closed valve 127 to its open position and to close it. A rigid valve arm 192 is pivotally connected by a pin 198 to a rigid valve arm 194 which is pivoted about a pin 200 which pin is firmly supported in the arm 84 near valve 122; arm 194 is pivotally connected to a valve lever support arm 202 which operates on a valve piston to move the normally open valve 122 to the closed position and to open it.

Arm 141 and arm 136 are both pivotally supported on pin 142 which pin is firmly supported in arm 84 near its middle, halfway between valves 122 and 127. Arm 136 is located between ears 147 and 148 of arm 146 of link arm 141 and is engageable by the ear 147 or 148. Slide 137 of arm 36 is located above arm 146; arm 136 extends below arm 146 to spring hole 153.

Figure 8:
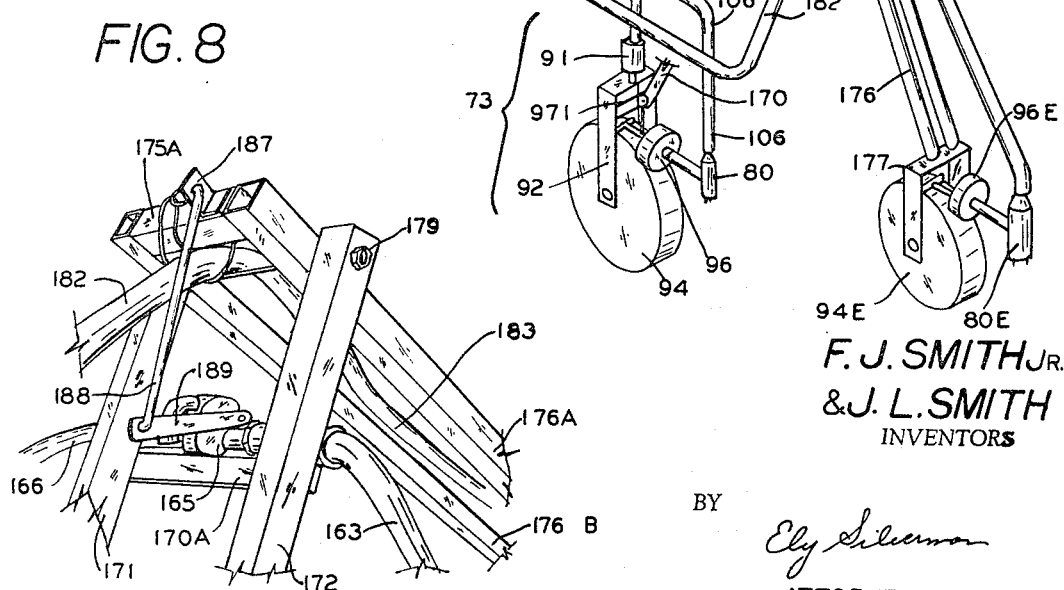
FIGURE 8 is an enlarged view of the valve control link subassembly in zone 8A of FIGURE 11 and FIGURE 7.

The pacemaker control frame subassembly 76 comprises a rigid forward lead arm 170 and a rear driven arm 176 pivotally connected together. Assembly 76 is pivotally connected by pin 971 to lug 97 on the yoke 92 of end station 52. A similar frame assembly 76G is attached to the frame of the other end station 59. The pivotal connection between arm 176 and pin 971 of yoke 92 permits rotation of arm 170 only in a vertical plane parallel to the vertical plane of wheel 94. The pivotal connection of arm 170 to arm 176 at a rigid pivot pin 179 (FIGURE 8) near the top of arm 176 permits relative rotation therebetween only in the same vertical plane. Assembly 76 includes a yoke 177 and a wheel assembly 73E. Arm 170 has a rigid left portion 171 and a rigid right portion 172 (as shown in FIGURE 8) rigidly joined to and by rigid braces as 170A and 170B. The arms 171 and 172 are connected by a rigid pivot pin 971 to the lug 97 on the yoke 92.

The pin 971 is threaded at its ends and provided with removable nuts for ready removal of assembly 76 from or attachment to lug 97 on yoke 92 on assembly 73 or lug 97A on yoke 92A of assembly 72.

The driven arm 176 comprises a rigid left arm, 176B and rigid right arm 176A (as seen in FIGURE 8) firmly joined at their front end by a rigid brace 175A and a rigid brace 175B at their rear. A pair of yoke arms 921E and 922 E form a downwardly extending yoke 177 which is firmly and rigidly attached to arm 176; a wheel 94E is rotatably supported on an axle on yoke 93E (FIGURE 36). Wheel 94E is the same diameter as wheels 94A and 94 but the cleats, as 101E, 102E on wheel 94E are spaced apart only ⅘ of the distance that the cleats as 101, 102, and 103 of wheels 94 and 94A (and 94B and 94C) are spaced apart along the rim of such wheels.

A piston 96E for wheel 94E is firmly supported by an ear 95E. Ear 95E is firmly attached onto the arms of the yoke 177. A valve 80E corresponds in structure and function to the valve 80 and is operatively attached to the piston 96E.

All components of the subassembly 73E on the pacemaker wheel subassembly 76, are given the reference letter "E" and numbers corresponding to the corresponding part in assembly 73, and have the same structure and size as in assembly 73 except for the connection of links corresponding to those (98 and 961) connected to pin 981. In assembly 73E the piston 96E is connected to the link 98E (corresponding to link 98 for wheel assembly 73) to provide link 99E and wheel 94E only ⅘ of the linear motion of the link 99 per stroke of piston 96E. The rigid piston shaft 961E of piston 96E is pivotally attached by a rigid pin 981E to a rigid link 98E: link 98E is pivotally attached to an upper fixed pivot pin 971E at lug 97E and, at a lower pin 991E, link 98E pivotally attaches to drive link 99E. Link 99E is rigid and contacts and drives wheel 94E in the same qualitative manner as link 94 drives wheel 94 by successive tangential propulsion of its cleats.

The distance of travel of pin 961E and 961 is the same (2½ inches): the length of links 98 and 98E are the same (from center of pivot 971E to 991E and from 971 to 991; i.e., 7 inches in preferred embodiment). However, by making the distance between centers of pins 971 and 981 three and one-half inches (3½") and distance between centers of pins 971E and 981E four and three-eighths (4⅜") inches, pin 991E travels only ⅘ the distance that pin 991 travels on the same stroke of the same sized pistons 96E and 96.

These absolute valves of the dimension of pin travel and spacing in links 98 and 98E are exemplary only. The feature that is important is the ratio of distance between centers of pins 971E and 981E and between centers of pins 981E and 991E relative to the distance between centers of pins 971 and 981 and between centers of pins 981 and 991 whereby even with the same drive piston travel the pacemaker wheel 94E moves a substantially lesser amount (20% less) than the linear travel of the wheel 94 on each piston stroke.

A lug 187 is rigidly attached to the forward end of the member 175A and is pivotally attached to a rigid link 188. This rigid link is pivotally attached to a rigid valve arm 189. The valve arm 189 is operatively attached to an all open or all closed valve 165 for the operation thereof. Valve 165 is firmly attached to and supported by brace 170A of arm 171.

The control frame assembly 76 is operatively connected with the timer subassembly 74 to control the passage of water from line 511 and valve 122 to the wheel subassemblies 72 and 73. One arm of the timer subassembly cross 124 is operatively attached by a T 161 upper arm to the adjustable timer control valve 132; the valve 132 is operatively connected by conduit line 131 to the piston 134. The other, lower, end of the T 161 is firmly attached to the top end of a T 162.

The side arm of the T 162 is operatively connected by a flexible power line hose 163 through a dimension compensating loop 164 to control valve 165 which is supported on the arm 170 of the subassembly 76. A valved line 166 extends from the outlet of valve 165 downward of arm 170 to a T 167 which is connected to the conduit lines 106 and 106A; line 106 goes to valve 80 and powers piston 96; line 106A is operatively connected to valve 80A and is operatively connected to and drives piston 96A for wheel assembly 72 (diagrammatically shown in FIGURE 7).

The lower arm of the T 162 is hydraulically connected by a pacemaker control flexible drive line hose 180 through a flexible dimension compensating loop 181 to an up-running conduit line 182 which is mechanically supported on the arm 170 and is hydraulically continuous with and flexibly connected to a downcoming conduit line 183. Line 183 is operatively connected to the valve 80E. Valve 80E is (see FIGURE 36) operatively connected to the piston 96E; piston 96E is provided with a drive link, 961E, which drives a cleat as 101E on the wheel 94E in the same qualitative manner that the links on wheel assemblies 72 and 73 move the wheels thereof.

Accordingly, when the disposition of valves 122 and 127 (as determined by timer assembly 74) provides for passage of fluid from line 511 to T 124, water at the pressure of line 511 passes from line 511 through the hoses or lines as 181, 182, 183, valve 80E and piston 96E and serves to drive the wheel 94E. On advance of the wheel 94E toward wheel 94 and rise in height of pin 179 due to the forward motion of the driven arm 176 relative to yoke 92 the link arm 188 (FIGURE 8) causes the valve 165 to open. Accordingly, if the wheel subassembly 73 is close to wheel 94E and/or not moving as fast as the pacemaker wheel 94E; e.g., because of slippage, it and assembly 73 will be actuated and moved when the valves 165 and 122 are open by the flow of hydraulic power to the wheel piston thereof.

The wheel 94E is usually moved more slowly than (e.g., only 80% of the linear speed of) the wheels 94 and 94A. Accordingly, on operation of assembly 74 the wheels 94 and 94A only move as far as permitted by the travel wheel 94E and assembly 76. When wheel 94E is too far behind wheel 94 the movement of assembly 76 and link 188 keep the normally closed valve 165 closed. On the next cycle of the timing mechanism 74 the valve 165 is kept shut until the distance of the wheel 94E from the wheel 73 is that for which it is adjusted. Thereafter, on the next stroke of piston 134, as wheel 94E is closer to wheel 94 the valve 165 will be opened. On the overall therefore, four out of five times as an average, on each opening and closing cycle of valve 122 by the subassembly 129 (usually a cycle of about 60 seconds) the frame 70 moves a fixed distance (about 5 inches). As the stations 59 and the station 52 are identical in structure and operation, adjustment on station 59 of the valve corresponding to 132 on station 52 provides that station 59 moves at the same speed as station 52.

At each cycle of piston 134 of assembly 74 line 511 is connected hydraulically (by line 121, valve 122, line 123 and cross 124) to the main hydraulic drive line 75. Line 75 is connected separately, through the control valve (e.g., valve 215 at station 53) of the control assembly (e.g., assembly 225 of station 53) to the wheel drive pistons (e.g., 96B and 96C of station 53) of each intermediaite station and thereby actuates the ground engaging wheels of that station and moves that station.

The interstation control system 225 of apparatus 51 comprises a control wire line 230, a series of control arms at each intermediate station (as 220 at station 53) connected to the wire 230, and a valve operatively connected to hydraulically powered wheels of the station and to a hydraulic power source and to the control arm, as valve 215 at station 53 is connected to line 511 and wheel assemblies 62 and 63. System 225 provides that the stations as 53–59 move at the same average speed as does the station 52.

An air relief valve 205 is provided on line 75 at each intermediate station at its bottom.

Valve 205 comprises an imperforate hollow vertical right cylindrical casing 204, the bottom 213 of which is operatively connected by a T 203 to line 75: its top is provided with a narrow vertical upstanding right cylindrical hollow neck 207. A perforated cap 209 is firmly seated on top of neck 207. A cylindrical chamber 212 is located in casing 204 and communicates via T 203 with the interior of line 75. The top of the wall 204 supports interior cylindrical perforated vertically elongated hollow cylindrical basket 205, the side and bottom walls of which basket are perforated by large perforations as 206A.

A spherical bouyant imperforate ball 208 with a diameter larger than the perforations but smaller than the diameter of the basket fits loosely in the basket: Ball 208 floats in water.

The basket 205 is open at its top to cylindrical neck 207 of the casing 204. Neck 207 is of less internal diameter than the external diameter of ball 208. A cap 209 fits on neck 207: cap 209 has perforations thereon. Valve 205 provides for release of aid from line 75. The air 211 that gathers above fluid 210 in chamber 212 escapes past ball 208: the ball 208, being bouyant serves as a seal against a seat 213 in neck 207 against escape of water through neck 207 after air has escaped through neck 207 and cap 209.

At each intermediate station, as 53, the line 75 is supported on the station frame, as 78, and operatively connected by a T and a power hose or line as 214 to the inlet of an intermediate station wheel drive control valve as 215. Each valve as 215 is firmly supported on frame 78 of station 53 and is an on-off valve operatively connected to and controlled by a rigid slotted wire-holding control arm, as 220. The outlet of each valve as 215 is operatively connected to a power return line 216 which line is firmly supported on the station frame as 78. Each line as 216 is hydraulically operatively connected by a T to a wheel power line as 217 which is supported on a frame member corresponding to member 81 of frame 70. At its front end line 217 is operatively connected to a valve 80B, drive cylinder 96B and wheel 94B corresponding in structure size and functions to valve 80, cylinder 96A and wheel 94A; at its rear end line 217 is operatively connected to a valve 80C, drive cylinder 96C and wheel 94C, corresponding in structure size and function to valve 80, cylinder 96 and wheel 94, respectively.

Each intermediate station frame, as frame 78 on station 53, firmly supports a rigid horizontal arm, as 84B. An on-off valve 215 identical in structure to valve 165 (FIGURE 8) is firmly attached to the arm and is connected via lines 214 and 216 to the hydraulic drive line 75 and drive wheel assemblies, as 62 and 63, of that intermediate station. A rigid control arm 220 is firmly attached to the valve arm (corresponding to arm 189 of valve 165, FIGURE 8) for pivotal motion in a vertical plane parallel to the length of arm 84B to open and close valve 165. Arm 220 is a rigid flat metal bar 1½" x ⅛" x 12" in the exemplary embodiment. It has an upper L-shaped slot 222 and lower L-shaped slot 226. Slit 222 has a long (4" in the exemplary embodiment) central vertical portion 223 and an upper short (¾" in exemplary embodiment) horizontal entry portion 224 and is ⅛" wide throughout. Slot 226 has a long central vertical portion 227 and an upper short horizontal portion 228 all ⅛" wide. The bottoms of slots 222 and 226 are equidistant (5" in the exemplary embodiment) from the center of the arm 220 (i.e., the point on arm 220 halfway between its ends) and which center is at the level of the center of valve 215 and at the level of a horizontal projection of the length of the arm 84B. Valve 215, like 165 is a cock valve.

A sturdy control wire 230 which runs the length of the apparatus 50, from element 84 of frame 70 of station 52 to a corresponding frame element of station 59, is reliably yet removably located in slot 226 (as shown in FIGURES 21 and 22) or in slot 222 (as shown in FIGURE 7) depending on the direction of travel desired of apparatus 50. Forward and rearward (as shown in FIGURES 5, 21 and 22) of wire 230 relative to the frame of each intermediate station causes the arm 220 to rotate and to respectively open or close the valve 215 on forward motion, as shown by arrow 48, of assembly 51. The vertical slots compensate for ground irregularity between stations.

Subassembly 60 comprises a first conduit pipe 232 and a second conduit pipe 233. Pipes 233 and 232 are pivotally joined together at a pivot joint 231, joint 231 having a vertical axis whereby pipes 232 and 233 pivot in horizontal planes about the vertical axis of joint 231. Pipe 233 is pivotally yet hydraulically operatively connected to assembly 51 at pivotal joint 270; pipe 232 is pivotally yet operatively connected to valve 44 of line 43 at pivotal joint 235.

Pipe 232 is pivotally connected by a pivotable pipe coupling 235 to the valve 44 on line 43. Coupling 235 comprises a disconnect coupling 267, a fixed L 265 (with an upstanding vertical arm) fixedly connected to the coupling 267 and, connected to L 265, a pivoting L 232A. Below its vertical arm the fixed L 265 is supported on a ground support 266; the horizontal arm of L 265 is connected by a conventional disconnect coupling 267 to outlet of valve 44 on line 43.

The end of pipe 232 distant from pivot 231 has a vertical downcoming arm that forms an L 232A. This forms a pivotal and water-tight connection with the upstanding vertical arm of L 265.

Pipe 232 pivots in a horizontal plane about the common vertical longitudinal axis of the vertical arms of L 265 and L 232A, which axis is also the center of coupling 235. A wheeled support 234 is provided at about ⅔ of the distance from the vertical axis of coupling 235 to the vertical axis of joint 231.

The support 234 comprises a rigid horizontal frame 280 joined at its middle by a clamp 287 to the pipe 232. At the front of frame 280 a front pivot 283 supports a rearwardly and downwardly directed front yoke 281; the yoke rotatably supports a front wheel 282. A similarly downwardly and rearwardly directed rear yoke 284 rotatably supports at its bottom a rear wheel 285 and is pivotally attached at its front to a pivot 286 on the rear end of frame 280.

A piston chamber 237 is firmly attached to and supported on pipe 32 near joint 231. Piston chamber 237 is a horizontally elongated cylindrical chamber with its longitudinal axis parallel to and vertically above the longitudinal axis of line 232. A movable piston and a part of its rigid cylindrical shaft 238 are located within the chamber 237. One portion of the shaft 238 projects from the chamber 237. Shaft 238 is co-axial with chamber 237. A pair of cable guide roll supports 290 and 291 are firmly supported on line 232 on each side of a line, in line with the longitudinal axis of shaft 238. Front and rear grooved cable guide wheels 292 and 293 are, respectively, supported rotatably on supports 290 and 291. One end, 239A of the hollow rigid rectangular frame 239 is firmly supported on the end of the piston shaft 238 which projects from chamber 237. The other end, 239B of the frame 239 is attached by a flexible cable 240 to notch 241A in sheave plate 241 on joint 231 and is thereby held to groove 245 of plate 241.

Cable 240 contacts the grooves of wheels 290 or 291 enroute therebetween to sheave 241 and keeps frame 239 aligned with pipe 232.

Pivot joint 231 comprises an upwardly directed L, 242 (which is firmly attached to the end of pipe 232 distant from joint 235), a downwardly directed L 243 on pipe 233, a sheave plate 241, and a horizontally rotatable bearing 248.

Plate 241 is a flat horizontal annular plate: it has an internal diameter greater than the external diameter of the upstanding arm of the L 242. It has an external diameter substantially greater than the external diameter of L 243. The outer edge of plate 241 is provided with a groove 245. Cable 240 fits into that groove. A knot 240A or other enlargement at the end of cable 240 fits into a peripherially open radial notch 241A in plate 241. This notch permits the cable 240 to be wound clockwise as in FIGURES 16, 17, and 18 in grove 245 to notch 241A or to be wound counterclockwise about groove 245 to notch 241A as in FIGURE 15. FIGURE 15 shows the arrangement for counterclockwise rotation of arm 233 relative to arm 232, as in motion shown at FIGURE 1, when the assembly 60 contracts on motion along direction of arrow 48.

The vertically upstanding arm 244 of the lower L 242 is provided with a collar 247 which provides the base of a bearing raceway for a plurality of conventional bearing balls, as 248. The plate 241 rests on top of those balls of the raceway therefor. An annular ring 249 extends around the collar 247. The ring is provided with an orifice 250 with a plug therein, 251, through which the balls, as 248, of the bearing may be supplied thereinto. The annular plate 241 is concentric with and firmly attached to the right cylindrical vertical downcoming arm 243A of the L 243 which is firmly attached to the end of pipe 233. Conventional seals, as 243B, provide for a water-tight connection between the vertical cylindrical and co-axial arms 244 and 243A. The arm 244 provides for vertical orientation and support of the arm 243A.

The arm 233 is provided at its end adjacent to the station 52 with a downcoming L 268. The vertical portion of L 268 is pivotally joined to an upcoming L arm 269, which is attached to the pipe 511. These two vertical portions of the L are pivotally and firmly fastened together by a conventional water-tight pivotal joint structure 270 and a quick disconnect coupling 269A substantially the same as at 235.

The arm 243A vertically extends about 3 feet upwards of the plate 241. A downwardly extending rigid vertical truss compression post arm 257 is provided at and is firmly attached to the middle of arm 233. It is the same vertical length as arm 243A. Conventional truss wires, as 258 and 258A, are each attached to collars, as 259 and 260, near to the ends of the pipe 233 and to the bottom of post arm 257 and provide for a support of the pipe 233 at a height so that the pipe 233 may pass over the pipe 232 during the normal travel thereof from the positions thereof shown in FIGURE 1 to the positions shown in FIGURE 2.

The pivot connection of the pipe 233 to the pipe 511 is shown in FIGURES 16 and 7, wherein the pivoting pipe 233 is higher than the pipe 511. This permits for pivoting of the member 233 about the left end (as shown in FIGURES 1 and 2) of the pipe 511.

The cylinder 237 is operatively attached by a fluid conduit line 237A to the line 232. Accordingly, in operation of the apparatus 60 and 51 shown in FIGURES 16, 17, and 18, the pressure in line 232 (40–100 p.s.i.g.) provides that the shaft 238 will produce a fixed amount of torque against the cable 240 and thereby produce a continued constant torque on plate 241 and on the L 243 and tend to rotate the arm 233 counterclockwise (as shown in FIGS. 17 and 18) from its position shown in FIG. 17 to its position shown in FIG. 18 relative to line 232 and also from its position at the right in FIG. 1 to the position shown at the left of FIG. 1 and therefrom 1 to the position shown at right of FIG. 2 and therefrom 1 to the position at the left of FIG. 2.

In the cable position of FIGS. 16, 17, and 18 the pressure of the water in line 232 also is applied to piston 238 and rotates the pipe 233 counterclockwise relative to pipe 232 and thereby helps to move as well as rotate the pipes 232 and 233 from the position thereof shown to the left of FIGURE 3 to the position shown in the right of FIG. 3; this action shown in FIG. 3 is continued when the apparatus 60 moves further right and downwards in the direction 49. The continued forced rotation of line 233 relative to line 232 counterclockwise at either position of assembly 60 relative to assembly 51 and line 43 by use of the pressure in line 232 compensates for the frictional torque and avoids stress on the pipes 232 and 233 at joint 231 during movement of apparatus 51 down and/or up the field 40 as shown in FIGS. 1–3; cable 240 may be wrapped clockwise; i.e., on the top side as shown in FIGS. 17 and 18 and on the left side as shown in FIGS. 15 and 16, to notch 241A in groove 245 as shown in FIG. 16 (rather than counterclockwise and on the opposite side thereof as shown in FIGS. 15, 17, and 18) when movement opposite to that shown in FIGS. 1–3 is desired. In the operation of the apparatus 50 connector assembly 60 is connected to the pivot 270 at the end station 52 and a water-tight plug is put on the other end of line 511, the end adjacent station 59. Pump 45 is started and valve 44 opened and water from line 43 passes through assembly 60 into the pipe 511 and outwards therefrom at the sprinklers as 531 and 532 between the stations 52 and 53 onto field 40 and also thereonto from the similar sprinklers 541 and 542, 551, 552, 561, 562, etc. Concurrently, water flows from line 511 through the the line 121. The normally open valve 122 permits water to pass therethrough to the T 161 and, therethrough, through adjustable valve 132 to the piston 134 in the assembly 74 and through line 75 for the wheel drive pistons as 96B and 96C in each of the intermediate stations and through line 163 for pistons 96 and 96A to drive the corresponding wheels 94B, 94C, 94, and 94A.

The piston 134, under the pressure of the fluid passing thereto from the valve 132 urges the piston 135 leftward from the position shown in FIGURE 24 to the position shown in FIGURE 25. The first step in such movement of the arm 135 leaves the adjustable positioning nuts 138 and 139, as shown in FIGURES 24 and 27, out of contact with the shaft-holding slide or sleeve 137 on the arm 136. Further movement leftward of the piston arm 135 brings the nut 138 into contact with the sleeve 137 as shown in FIGURE 28. On continued movement of arm 135 and continued contact of the nut 138 with the sleeve 137 the arm 136 is rotated clockwise to the position shown in FIGURE 29. At this point; i.e., at the position shown in FIGURE 29, the nut 138 on the shaft 135 has urged arm 136 counterclockwise to the position whereat the arm 136 is vertical. The arm 141 is, at this point, just then contacted at its ear 148 by the lower portion of the arm 136. Further motion leftward of the piston 135 to the position generally shown in FIGURES 25 and 30 results in that the arm 136 moves the ear 148 to the point shown in FIGURE 30 at which the arm 141 is vertical and compresses the spring 156 because the arm 136 has engaged the ear 148 and pushed and rotated the ear 148 and arm 141 about the pin 142 to such a degree that the arm 141 is then substantially vertical and the previously diagonal spring 156 is vertical. The subsequent slightly leftward motion of the shaft 135 at this point; i.e., toward the position shown in FIGURE 31 results in that the arm 141 is rotated at its lower portion clockwise of its previous position shown in FIGURE 30 and is tilted downward and slightly to the left. Thereupon, the compressed compression spring 156 expands and, with a snap action rapidly snaps and/or urges the arm 141 in the clockwise direction (as shown in FIGURE 31) and results in that the ear 148 of arm 146 is rapidly moved out of contact with the arm 136. In the resulting position of parts, which position is shown broadly also in FIGURE 26, the C-shaped arm 146 of the link arm 141 is out of contact with the arm 136.

On completion of this above described slow-then-snap-action motion of the arm 141 from the position shown in FIGURES 24 and 27 to the position of arm 141 as shown in FIGURES 31 and 26 the concomitant movements of link arms 191, 192, 193, and 194 with arm 141 rapidly change their position relative to the valves 122 and 127. This rapid or snap change in position of those arms results in that the normally open valve 122, open in the position shown in FIGURE 24, is rapidly and firmly closed and the valve 127, closed in the position shown in FIGURE 24, is rapidly opened. This opening of the valve 127 results in a flow of water from portions of the hydraulic system in assembly 74 and line 75 then open to the line 128, in particular, the content of the piston 134 (which has the same structure as shown for piston 96 in FIGURES 19 and 20) previously to the right of the piston plate in that piston and a fall in pressure in line 75 and below valve 122. More particularly a volume equal to that portion of water previously in the chamber of piston 134 is displaced via line 131, valve 132, line 125, valve 127 and line 128 to line 158 (which line 158 is attached to line 511 between stations 52 and 53) and this water is discharged to the ground while valve 122 is kept closed.

Also, this fall in pressure below valve 122 causes the pressure in line 75 to fall and the valves, as 80B and 80C, to open and the wheel pistons as 96B and 96C to contract all along assembly 51.

With the loss of this discharge pressure, the supplemental piston return spring 154 which is attached to the nut 138 and is a tension spring attached to the arm 135 (and a spring in piston 134 corresponding to spring 967 in piston 96) begins to draw back the arm 135:nut 139 moves toward slide 137 as soon as the pressure to the rear side (right in FIGURES 24–35) of the piston 134 falls when arm 135 is then moved counterclockwise from the position shown in FIGURE 31 to the position shown in FIGURE 32 whereat the nut 139 engages the slide 137.

Continued contraction of the spring 154 urges the nut 139 and the slide 137 and the arm 136 further counterclockwise to the position shown in FIGURE 33 and, thereafter, the spring 154 urges the arm 141 to the position shown in FIGURE 34 and the spring 156 is again compressed preparatory to a snap action release and movement of arm 141.

In the position shown in FIGURE 33 the arm 136 is vertical but does not yet engage the ear 147 of the arm 146 of the arm 141. On further counterclockwise motion of the arm 135 relative to the position shown in FIGURE 33 the arm 136 engages the ear 147 of the arm 141 and moves arm 141 from the downward and leftward position shown in FIGURE 33 to the vertical position shown in FIGURE 34 and compresses spring 156. On further rightward motion of the arm 135 the arm 141 is tilted downward and slightly to the right. At this position the spring 156 is released and operates against the bottom of the arm 141 to rapidly drive the arm 141 all the way to the right. This snap action quickly brings the arms 136 and 141 to the position shown in FIGURES 35 and 24 and this rapid snap action terminal movement of the arm 141 concurrently brings the arms 191, 192, 193, and 194 to the position thereof shown in FIGURE 24. At that position valve 127 is then closed and the valve 122 is then opened and fluid again flows from the line 121 through valve 122 into the line 161 and also into the line 75 to the stations as 53–58. At this point an interrelationship below described between the operation of the drive wheel assemblies 72 and 73 on the end station 52 and drive wheels of the intermediate stations becomes effective as well as with assembly 76.

The pacemaker control subassembly position controls the opening and closing of the valve 165 as above described. Accordingly, when the valve 122 is open that flow of liquid which would normally pass through lines 163 and 166 to lines 106 and 106A to the wheel cylinders 96 and 96A is controlled by the valve 165. The operation of the valve 165 is determined at arm 188 by the position of the wheel 94E relative to wheel 94 and frame 76. Because of the firm yet pivotal attachment of the arm 170 to the yoke 92 and the similar firm pivotal connection permitting rotation only in one plane of the arm 170 relative to arm 176 and the rigid connection of the arm 176 to the yoke 177, the wheel 94E tracks along in a vertical position to the rear of the wheel 94. The distance between wheels 94 and 94E is determined by the relative speeds of the wheels 94E and 94.

Fluid passes through the T 161 to the lines 180, 181, 182, and 183 to the valve 96E and wheel cylinder 96E when the valve 122 is open and the valve 127 is closed; the piston of the cylinder 96E then is urged forward and it urges its link 99E against wheel 94E and urges the wheel 94E forward. However, as above explained and shown also in FIGURE 37, the link arm 99E doesn't move quite as far (only 80% as far) as the maximum travel of the link 99 (FIGURE 10). Accordingly, the limited travel of the wheel 94E controls the potential travel of the wheel 94 by the action of the subassembly 76 on the valve 165. However, concurrent with the pulses of pressure to piston 96E, the pulses of pressurized liquid in line 75 passes via lines, as 214 and 216, to the wheel piston subassemblies, as 96B and 96C, that drive the drive wheels, as 94B and 94C, of each of the intermediate station, as 53. However, if any one station such as station 57 in FIGURE 5 should get ahead of the other stations, as 58, 56, and 55, because of a downhill situation or of mud everywhere else except in the path of that particular station 57, the automatic movement of the control arm 220 by line 230 cuts off flow to the wheel pistons thereof by the control valve in each such subassembly, such as valve 215 in station 53. When the station, as 54, is behind all the other stations the control arm therefor such as 220 automatically is moved by line 230 to a position such as shown in FIGURE 22 which keeps the control valve therefor (as 215 in station 53) open.

In a situation as shown for station 57 in FIGURE 5 the control arm of that station is located in the retard position (as is shown for station 53 in FIGURE 21) and the valve for that particular station 57 is closed and the drive wheels of that particular station are not moved until the control arm position therefor is changed.

Accordingly, the path of each substation as 53, 54, 55, 57, 58, is controlled by the periodic pulses provided to the line 75 by the subassembly 74. The speed of apparatus 51 depends on the size and frequency of stroke of links 99 (about five inches for wheel 94 on each full stroke of pistons 96 and 96A in the exemplary embodiment). The number of strokes of links and of pistons, as 96 and 96E, is controlled by the subassembly 74. The speed of the subassembly 74 is controlled by the valve 132. Opening the valve 132 wide results in a movement of the piston 134 from its fully retracted position shown in FIGURE 24 to its fully extended position shown in FIGURE 26 and the return to the FIGURE 24 position rapidly. A smaller opening of valve 132 results in a slower filling of the piston 134 and a slower rate of operation of assembly 74. The exemplary embodiment 51 hereinabove described provides for a range between 40 seconds and 200 seconds for a complete cycle (from position of FIGURE 24 to that of FIGURE 26 and back) of the subassembly 129 of the assembly 74 and, accordingly, of each of the power driven wheel subassemblies in the apparatus 51 and for fixing the time of cycle to ±2 seconds by vlave 132.

A description of the overall operation of the apparatus 51 as shown in FIGURES 1, 2, and 3 follows:

In operation the apparatus 50 which comprises the connector assembly 60 and the sprinkler apparatus 51 is pivotally attached to the valve 44 by joints 235 and 270. Pressurized water at 80 p.s.i. passes from the pump 45 via line 43 and valve 44, through the connector assembly 60 to the sprinkler element 51 pivotally connected to arm 233. The timer subassembly 74 of the end station 52 provides for, as above described, driving the pacemaker wheel 94E. The speed of the pacemaker wheel 94E determines the actuation or lack thereof of the drive wheels assemblies 72 and 73 of the station 52. The frame 70 has attached thereto at its cross brace 84 one end of the control wire 230. The wire 230 passes through a pivotally mounted control element such as 220 on the frame as 78 of each of the intermediate stations, as 53 to a member 84G on station 59.

The wheel subassemblies as 72 and 73 of each station, as 52 are located (by pin as 922) relative to the frame as 70 of each station with the plane of rotation of the wheels thereof transverse to the direction of length of pipe 511. Valve 44 is opened and the stations of the assembly 50 all move transverse to the direction of the pipe 511. The speed at which each station operates at any one moment is dependent on the traction of the wheel subassemblies of each such station make with the ground therebelow. The sprinklers as 531, 532, 541, 542 on line 511 spray water in equal and overlapping circles, as 401, 402, 403, 404. On movement of the apparatus 50 in direction 48, the water is distributed over field 40 in overlapping rectangular strips, as 411, 412, 413, 414; such strips are elongated in the direction of motion of the apparatus 51 and completely and evenly cover the portions of the field traversed by assembly 51.

If any one station, as 54 in FIGURE 5, lags behind the others the control arm thereof corresponding to arm 220 of subassembly 53 thereof is moved to position such as in FIGURE 22 which causes the valve corresponding to valve 215 of subassembly 53 to be opened and the wheels thereof to be advanced by the passage of water from the lines 75 to the pistons, as 95B and 96C of the wheel subassemblies as 62 and 63 of each of such intermediate station. When one assembly, as 57, in FIGURE 5, is ahead of the other stations of assembly 51 in the path of travel of the assembly 51 the control arms corresponding to arm 220 of that station 57 is moved by wire 230 to a position as in FIGURE 21 which cuts off the supply of fluid power to the wheel drive pistons of the drive wheel assembly of that particular station. Accordingly, the stations in retard of the others are fed fluid power until they reach a position at which such theretofore retarded station and the stations adjacent thereto are all advancing at the same average speed.

This shut-off is a complete shut-off for any one cycle and, for such cycle which ranges from 40 to 200 seconds there is no motion of that station. When a station is generally in line with the others of assembly 51, it moves forward together with the other stations.

The above description covers the movement of the stations of the apparatus generally in a straight line, but does not necessarily provide that the line of stations is always transverse to the length of the field, as 40, being traversed thereby. The feature that the apparatus 51 automatically marches in a line transverse to the length of the field is guaranteed by that the end stations 52 and 59 do have the same structure and valves 132 and 132G are adjusted to drive their stations at the same speed. As the end stations travel at the same speed, this provides that, with the intermediate stations being in a straight line between those two end stations, that the entire apparatus 51 and 60 will travel down the field as 40 transverse to the length thereof.

According to the above, the components of the station 59 are identical to those of 52 except for the pivotal connection of 52 to the connector pipe 233 at any one setting and a plug in pipe 511 lateral to station 59 so the pipe 511 is closed lateral to station 59. As below described, the station 59 can also connect to the connector assembly 60 as well as can the station 52, as shown in FIGURE 3.

The above control of speed of operations of the substations of the assembly 51 provide for a movement of pipe 511 transverse to the length of the field of the entire apparatus 51 during its sprinkling operation and an even sprinkling of that field (41).

After the sprinkler apparatus 51 has moved the entire length of extent of assembly 60 from one portion thereof extended to the right, as shown in FIGURE 1 to the position thereof fully extended to the left, as shown in FIGURE 2, the valve 44 is closed, the assembly 60 is disconnected at the disconnect coupling 267 and the coupling 267 of assembly 60 connected to a valve as 44A spaced away from valve 44 up to about 180% the full extended length of assembly 60 along pipe 43.

On reaching one end of the field 40 the yoke as 92, of each wheel assembly, as 73, may be rotated 90 degrees as shown in FIGS. 6 and 13. Pivot shafts as 921 atop of each yoke and the releasable pin there, as 922, permit the shafts of the yokes 92 to be rotated to and held in a position with the plane of rotation of the wheels as 94 and 94E transverse to that shown in FIGURE 10. This provides for the transverse location of each yoke as 92 and the wheel therewith for all stations, as 52–59, of assembly 51. As the subassembly 76 is attached to a portion of the yoke 92, it is accordingly then moved to a position parallel to the plane of rotation of the wheel 94 as shown in FIGURE 6. Similar relationships hold with the corresponding portions of the other end station, 59.

When the subassembly 51 has been moved from field portion 41 to the location on the other side, 42, of the field 40, as shown in FIGURE 3, arm 170 of the subassembly 76 is disconnected at pin 971 from the lug 97 and attached onto a corresponding lug on the yoke 92A. A corresponding lug 97A is provided on the yoke 92A of the wheel subassembly 72. This provides, as shown in FIGURE 3, for the location of the member 170 on the yoke 92A. The hose connections of the pacemaker subassembly 76 are unchanged in their hydraulic operation, the hose 180 merely wrapping around the hose 121 and reaches readily to the other side of arm 90 and performs its same function of controlling, at valve 165, the flow of water from T 124 to pistons 96 and 96A when, as shown in FIGURE 3, the wheel assemblies, as 72 and 73, of each station of assembly 51 are arranged to move opposite to the direction of movement of the stations shown of FIGURES 1, 2, 4, and 5.

During motion of the apparatus 51 from the position shown in FIGURE 2 to the position shown in FIGURE 3 by transverse setting of the wheels as shown in FIGURE 6 the motor power for such movement is provided by a conventional tractor which is attached to and pulls one end station, i.e., 52 and pipe 511 of the apparatus 51.

The alteration of the apparatus 51 from the connections provided for movement upwards and to the left, as in FIGURES 1 and 2, to the position for moving in the opposite direction, i.e., in the direction downward and to the right as shown in FIGURE 3, and (1) assembly 60 is connected by the pivot joint 270 to the end of pipe 511 adjacent station 59 and the end of pipe 511 adjacent station 52 is plugged, and (2) the control line wire 230 (which extends from the arm 84 of subassembly 52 to the corresponding arm 84G on the other end station, 59) is at each intermediate station moved from the lower slot 226 of control arm as 220 as shown in FIGURE 22 to the upper slot 222 of arm 220 as shown generally in FIGURE 7. A station, as 54, which would be to the right of the line of stations as shown in FIGURE 5 and generally to the rear of the apparatus 51 during its motion upward and to the left (direction 48) while remaining in the same relative position would, on movement downward and to the right, be forward of the remainder of the stations in the assembly 50. This movement of line 230 on reversal of motion of apparatus 51 provides that the power through the control valve (as 215 of station 53) of such station 54 be cut off (rather than permitted) on movement as shown in FIGURE 3. This structure of arms as 220 permits that a station, as 57 of FIGURE 5 which (on moving upward and to the left and being in advance of the line of stations would have no power sent it according to the arrangement shown in FIGURE 21) would, by reversing of the motion of the assembly 51 to move downward and to the right as in FIGURE 3 and movement of line 230 to the upper slot of control arm 220, provide for supplying full flow of hydraulic power to the wheel subassemblies of that station when in the relative position shown in FIGURE 5. The cut-off is effective in the same manner as such power is cut-off when the arm 220 reaches the orientation shown in FIGURE 21. (The orientation shown in FIGURE 21 is that provided on a station as 57 during the disposition of the substations as shown in FIGURE 5 during travel upward and to the left.) Accordingly, the control apparatus 225 of this invention (frames as 78, wire 230, arms as 220 and 84, valves as 215) provides for control of the action of the drive wheel piston subassemblies of each station during motion thereof in either direction transverse to the length of the pipe 551.

The apparatus shown in FIGURE 16 is the same as in FIGURE 15 generally, except that there is no truss structure, as 357, provided in assembly 67 of FIGURE 16 and the arms 243A and 268 of FIGURE 15 are substantially shortened. Accordingly, the arm 233 of assembly 67 does not automatically pass over the arm 232 and the arm 233 is provided with a separate wheel structure 288, identical to 234 and firmly attachable to and supporting pipe 233 (in 67) for its movement parallel to the pipeline 43. Structure 288 may be detached from pipe 233 for a short distance to permit pipe 233 to pass over pipe 232. At each station the frame as 70 as above described provides for locating the pipe 511 on member 86 for support rather than on the transverse support arm 851, shown therefor in FIGURES 9, 11, 12 and 14. This provides that the pipe 511 may ride on correspondingly high supports, as 84 and 84B, for the entire length of the apparatus 50 and thereby be at a greater height, which is particularly useful when watering relatively high crops.

It is within the scope of this invention that the connector subassembly 60 may be used with other apparatuses and also, that the apparatus 50 may be used with other connectors that will connect it to the pipeline 43. It is, however, particularly beneficial to use the apparatus 60 because the piston 237 thereof makes use of the hydraulic power in the pipe to facilitate the turning of the upper pipe 233 with respect to the lower pipe 232.

Additional dimensions of the exemplary embodiment are given in Table I.

Each transverse pipe support arm, as 851 on station 52, is firmly yet adjustably locatable vertically anywhere on arms 82 and 83 on the corresponding frame of all the stations of assembly 51 for firmly locating and supporting pipe 511 at any desired height in that range.

TABLE I

| Item Measured | Identity or Point to Point Distance | Measurement |
| --- | --- | --- |
| Arm 98 | Pin 991–971 | 7″. |
| Arm 98 | Pin 971–981 | 3½″ (Fig. 10). |
| Spacing | 83–84 | 2½ ft. |
| Height | 84 Ground | 43″. |
| Frame 70 | 84–86 | 8′8″. |
| Size of Members | 84 | 2″ Steel Angles. |
| Diameter | 94 | 28″. |
| Width | Rim 9 | 5″. |
| Height of cleat | 103 | ¾″. |
| Station Spacing | 52–53 | 30′. |
| Do | 58–59 | 30′. |
| Do | 53–54 | 60′. |
| Diameter | 232 | 6″. |
| Do | 511 | 6″. |
| Length 232 | C.L. 231 to C.L.* 235 | 30′. |
| Length 233 | C.L. 231 to C.L. 270 | 40′. |
| Stroke | 135 | 2½″. |
| Length 135 | C.L. 142 to C.L. 156 | 18″. |
| Pipe Size | 125 | 2″ i.d. |
| Length | 176 | 5′8″. |
| Piston Diameter | 96 | 7″. |

*C.L.=center line or vertical axis of pivot joint.

While above described, for versatility of control, a timer assembly (74 and 74G) is shown on both stations 52 and 59, only one timer assembly 74H, identical to 74, may be used and it be located on an intermediate station (shown as 56 in FIGURES 2, 4, 5, and 6); then the timer assemblies on the end stations as 52 and 59 will not be provided. Thereby, one timer is provided for the entire apparatus 51. In this situation the water from the line 43 comes to the main line 511 and passes therethrough to a line 121H which feeds timer 74H located at such intermediate or middle station. The line 75 is then connected as shown in FIGURE 7 to the cross 124 at the bottom of the assembly 74H and this line 75 goes to all the other stations and operates the drive wheels of those stations as above described.

The use of two separate timer subassemblies, one (74) on station 52 and the other (74G) on station 59, as above described, provides that there may be a controlled variation or fixed ratio of speeds of those two stations; in the hereinabove described apparatus 51 using only one timer subassembly (74H) the same pulse of fluid will go to all the stations of apparatus 51 during the operation of the machine and assures that each of the stations on the assembly 51 will travel at the same speed and in a straight line as above described.

It is also within the scope of this invention that an additional pacemaker assembly 76H, identical to 76, shown in the drawings as attached to an assembly 56: 56 is, in the actual embodiment, located in the middle of the entire assembly 51.

The pacemaker wheels assemblies as 76 and 76G and 76H assure that the station to which such pacemaker subassembly is attached, (such as station 52 for pacemaker subassembly 76, station 59 for subassembly 76G and station 56 for an additional pacemaker subassembly 76H)

each travel at a speed controlled by that pacemaker assembly. The controlled speed of each such station is that at which it is controlled by its pacemaker subassembly. The pacemaker subassemblies of assembly 51 are identical. The speed at which each station attached to an identical pacemaker subassembly travels is, accordingly, the same. The control subassembly 225 assures that the stations between the stations that do not have pacemaker subassemblies travel at the same speed as those stations that have the pacemaker subassemblies.

Where one timer assembly, as 74H, is used this third pacemaker subassembly 76H, (which is identical in operation to the pacemaker assembly 76 above described for station 52 and also identical to pacemaker assembly 76G for attachment to station 59) provides for closer control for straight line advance of the assembly 51 in a direction transverse to the length of the pipe 511 than with two pacemaker assemblies.

As above taught (in column 16, lines 59–65) the link arm 99E moves only 80% of the travel of the link 99. The advantage of this 20% difference is that any stations on the assembly 51 may lag in average travel for a period of time by 20% of the travel of other stations of assembly 51 and its alignment relative to the remaining station of the apparatus 51 be closely and effectively controlled. In the preferred embodiment the end station pacemakers (and the intermediate pacemaker, as 76H) provide for 80% ratio of potential linear travel of the pacemaker wheel as 94E to the potential travel of drive wheels as 94 and 94A.

However, other ratios between those wheels are within the scope of this invention such as 50% to 90%, but for practical purposes the 80% is preferred.

Although, in accordance with the provisions of the patent statutes, particular presently preferred and exemplary embodiments of this invention have been described in the best mode in which it is now contemplated applying such principles, it will be understood that the operations and constructions shown and described are illustrative and that our invention is not limited thereto and, accordingly, alterations and modifications which readily suggest themselves to persons skilled in the art without departing from the true spirit of the disclosure hereinabove are intended to be included in the scope of the annexed claims.

We claim:

1. A process of irrigating a field comprising the steps of:
   (I) Passing water under pressure through a first fixed pipe to a second, movable pipe extending at an angle to said first pipe and supported by a plurality of spaced apart intermediate movable pipe support stations and a pair of end pipe supporting stations moving at equal linear speed and moving said movable pipe continually and concurrently sprinkling a portion of said water on said field from said movable pipe in a series of parallel overlapping strips, said strips each elongated in the direction of travel of said sprinkler pipe, while
   (II) Passing another portion of water under pressure from said fixed pipe to and actuating thereby a hydraulically timed valve means at each end station and passing water at timed intervals through said valve means and thereby
      (a) actuating a first hydraulic drive means for said end station at one speed and concurrently,
      (b) actuating a second drive wheel means at each said station at a slower speed, and
      (c) opening and closing off the flow of fluid to said first drive means in response to the distance of said second drive wheel means relative to said first drive wheel means, and
      (d) opening and closing a hydraulic path from said hydraulically timed valve to hydraulic power means at end of said intermediate stations in response to movement of any one of said intermediate stations to a position rearward or forward, respectively, of a line between said end stations during advance of said second movable pipe.

2. Process as in claim 1 wherein the first pipe is connected to said second pipe by a series of pivotally joined rigid pipes, and said water under pressure is applied to means between said pivotally joined pipes to rotate said pivotally joined pipes relative to each other and force one end of at least one end of at least one of said pipes in the direction of movement of said movable pipes relative to said fixed pipe.

3. A process of sprinkling the field by a traveling sprinkler pipe comprising the steps of passing irrigation water through a first fixed pipe extending the length of the field to be irrigated, and, therefrom, into a second pipe pivoted to and hydraulically connected to a third movable pipe, applying pressure between said second and third movable pipe to rotate said second pipe relative to the third pipe and to move both ends of said third pipe and one end of said second pipe in the same direction of movement as said sprinkler pipe.

4. Method of controlling the speed of an irrigation pipe supporting station comprising the steps of interimittently passing a portion of irrigation fluid under pressure to a hydraulic piston and driving a ground engaging wheel means by such piston in said station while concurrently passing a portion of said irrigation fluid to a second hydraulically driven ground engaging wheel, driving said second wheel at a slower speed than the first drive wheel, and opening and closing the flow of fluid to the first piston means in response to the near and distant spacing of said second wheel relative to said first wheel.

5. An apparatus for irrigating a field comprising the combination of a series of pipe supporting stations spaced apart along and joined to a sprinkler pipe, said series of stations comprising a plurality of intermediate stations and two end stations, each end station being lateral of the intermediate stations, each station comprising a vertically extending main frame and a pair of ground engaging drive wheels rotatably attached to said main frame, a hydraulic piston operatively attached to at least one of said wheels, and a hydraulic drive wheel conduit line operatively attached to said piston, each lateral end station of said series comprising also a hydraulic timer assembly and a speed control assembly;

said speed control assembly comprising a drive piston, a third ground engaging wheel, and an extensible frame, said extensible frame firmly supporting said piston and said third wheel, said drive piston engaging and driving said third wheel, said extensible frame being attached to said main frame, said third wheel spaced away from said wheel on said main frame, and a valve control means operatively connected to the drive wheel piston conduit of said end station supported on said extensible frame and sensitive to the degree of extension of said extensible frame, said timer assembly being operatively attached to said drive wheels on said end station through said control valve on said extensible frame;

an intermediate station control valve means firmly supported on the main frame of each intermediate station and a hydraulic line extending from said timer assembly on said one end station along said sprinkler pipe and supported thereon to each of said intermediate stations and, at each of the said intermediate stations there connected to the intermediate station control valve means thereof, said intermediate control valve means being connected to the hydraulic drive wheel conduit line attached to the hydraulic piston which is attached to the ground engaging drive wheel on said intermediate station, a rigid valve control link pivotally mounted on the main frame of each intermediate station in the same relative position on each intermediate station and operatively connected to the intermediate station control valve on said station and a cable means extending from one end station to the other end station and extending across several intermediate stations, said cable means extending from one end station to the other and engaging the control link of each intermediate station.

6. An apparatus as in claim 5 and also wherein said speed control assembly comprises a first rigid member pivotally attached to said main frame, a second rigid member pivotally attached to said first member, a wheel yoke firmly attached to said second member, a ground engaging wheel rotatably attached to said yoke, a hydraulic piston firmly supported on said yoke and operatively attached to link means operatively attachable to said ground engaging wheel, a hydraulic conduit line extending from said timer assembly to said piston on said yoke, said link means between said piston and said control assembly wheel having a stroke substantially smaller than the stroke of the piston assembly of said ground engaging wheels on said main frame of said end station and pivot supporting means at the front and rear end of the main frame of each end station for engagement with the first rigid member of said speed control assembly.

7. An apparatus as in claim 5 wherein said control arm has cable holding means positioned on opposite sides of the pivotal attachment thereof to the frame of said intermediate station, which provides for opening said intermediate station control valve on motion of said cable rearward of said intermediate station frame and the other position providing for closing of said valve on motion of said cable forward of said intermediate station frame.

8. An apparatus as in claim 6 wherein the timer assembly comprises a rigid frame attached to the main frame of said end station and with an inlet valve at one end thereof and an outlet valve at the other, a hydraulic conduit line operatively connecting said sprinkler pipe to said inlet valve, a conduit extending from said inlet valve to said outlet valve, a piston supported firmly on the main frame of said end station between said first and second valves;

a snap link subassembly connected at one end to both of said valves and at its other end connected to said piston, said snap link assembly being supported on the said frame;

said piston being operatively connected to an adjustable valve, that adjustable valve being operatively connected to the hydraulic conduit line between said inlet valve and said outlet valve, and said line connecting said inlet and outlet valves is operatively connected to the speed control assembly and to the piston connected to the drive wheel of said end assembly and to the hydraulic line which extends along said pipe to each of said intermediate stations.

9. An apparatus as in claim 5 in combination with a sprinkler connector assembly pivotally connected to one end of said sprinkler pipe, said sprinkler connector assembly comprising a first conduit pipe and a second conduit pipe pivotally and hydraulically joined together at a joint with a vertical axis, said first conduit having an annular ring firmly attached thereto at said joint, a piston chamber fixed to said first conduit and hydraulically joined to the interior of said conduit, a movable piston in said chamber operatively mechanically connected to a connecting means that is attached to the periphery of said annular ring and movable therewith about said vertical axis of said joint.

References Cited

UNITED STATES PATENTS

| 2,726,895 | 12/1955 | Behlen | 239—212 |
| 2,940,672 | 6/1960 | Gaskell | 239—212 |
| 3,255,968 | 6/1966 | Stafford | 239—212 |
| 3,281,080 | 10/1966 | Hogg | 239—212 |

FOREIGN PATENTS

| 1,170,702 | 5/1964 | Germany. |
| 1,185,855 | 1/1965 | Germany. |

EVERETT W. KIRBY, *Primary Examiner.*